United States Patent [19]

Ishio et al.

[11] Patent Number: 4,985,188

[45] Date of Patent: Jan. 15, 1991

[54] PROCESS FOR PRODUCING CROSS-LINKED LAMINATED FILM

[75] Inventors: Tadashi Ishio; Daisuke Matsumura, both of Suzuka, Japan

[73] Assignee: Asahi Kasei Kogyo Kabushiki Kaisha, Osaka, Japan

[21] Appl. No.: 388,107

[22] Filed: Aug. 1, 1989

Related U.S. Application Data

[62] Division of Ser. No. 124,796, Oct. 22, 1987, Pat. No. 4,863,768.

[30] Foreign Application Priority Data

Jun. 19, 1986 [JP] Japan .................. 61-141345

[51] Int. Cl.⁵ ............................................ B29C 71/04
[52] U.S. Cl. .................................. 264/22; 264/512; 264/514; 264/173; 264/289.3; 264/342 R
[58] Field of Search ............... 264/22, 173, 514, 512, 264/289.3, 342 R

[56] References Cited

U.S. PATENT DOCUMENTS

| | | |
|---|---|---|
| 4,036,719 | 7/1977 | Lyons . |
| 4,044,187 | 8/1977 | Kremkau . |
| 4,161,562 | 7/1979 | Yoshikawa et al. . |
| 4,183,882 | 1/1980 | Weinberg et al. ............... 264/22 |
| 4,225,373 | 9/1980 | Bieler et al. ............... 264/22 |
| 4,274,900 | 6/1981 | Mueller et al. . |
| 4,390,587 | 6/1983 | Yoshimura et al. . |
| 4,448,792 | 5/1984 | Schirmer . |
| 4,590,020 | 5/1986 | Itaba et al. ............... 264/22 |
| 4,636,340 | 1/1987 | Itaba et al. ............... 264/22 |
| 4,699,846 | 10/1987 | Ohya et al. ............... 264/22 |
| 4,714,638 | 12/1987 | Lustig et al. . |
| 4,724,176 | 2/1988 | Sun . |
| 4,737,391 | 4/1988 | Lustig et al. . |
| 4,740,400 | 4/1988 | Lustig et al. . |
| 4,797,235 | 1/1989 | Garland et al. ............... 264/22 |
| 4,798,751 | 1/1989 | Schuetz ............... 264/173 |
| 4,865,780 | 9/1989 | Lustig et al. ............... 264/22 |

FOREIGN PATENT DOCUMENTS

| | | |
|---|---|---|
| 0022184 | 1/1981 | European Pat. Off. . |
| 0202814 | 11/1986 | European Pat. Off. . |
| 3342577 | 6/1984 | Fed. Rep. of Germany ........ 264/22 |
| 53-128672 | 11/1978 | Japan ........ 264/22 |
| 60-224536 | 10/1985 | Japan ........ 264/514 |

*Primary Examiner*—Jeffery Thurlow
*Attorney, Agent, or Firm*—Armstrong, Nikaido Marmelstein, Kubovcik and Murray

[57] ABSTRACT

A process for producing a cross-linked laminated film by:

(a) forming a laminate by disposing at least one polyolefin resin layer (II) on one side of an oxygen barrier core layer (I); and then disposing an adhesive shrinkable resin layer (III) and sealing resin layer (IV) in this order on the other side of said core layer (I), (b) irradiating an electron beam to laminate from the surface side of the layer (II) so as to cause the layer (II) to have a gel fraction x at the outside portion of 25–70% by weight, a gel fraction y at the inner portion contacting the side of the layer (I) of 40% by weight or less, and a gradient of gel fraction represented by y/x of 0.6 or less, without cross-linking the layer (IV), and (c) stretching the thus cross-linked laminate.

12 Claims, 8 Drawing Sheets

ETHYLENE-α-OLEFIN COPOLYMER RESIN

EVA ETHYLENE-α-OLEFIN COPOLYMER ELASTOMER

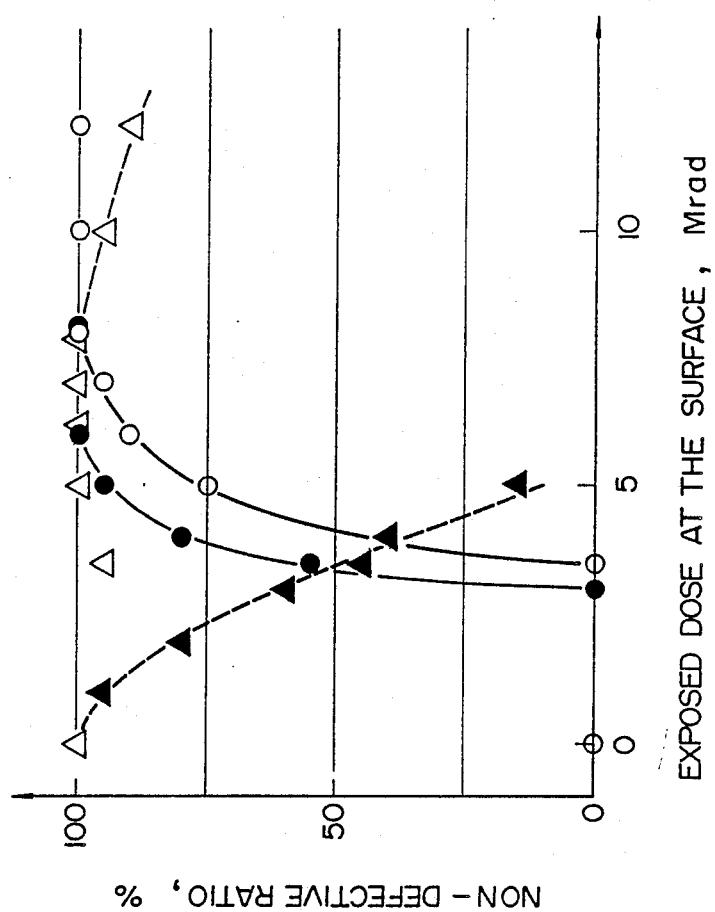

PROCESS FOR PRODUCING CROSS-LINKED LAMINATED FILM

This is a division of application Ser. No. 124,796, filed Oct. 22, 1987, now U.S. Pat. No. 4,863,768, issued Sept. 5, 1989.

DESCRIPTION

1. Technical Field

This invention relates to an improvement of cylindrical laminated films which are used for heat shrinking packages of irregularly shaped fatty food as contents such as raw meat, processed meat or the like.

2. Background Art

Heat shrinkable cylindrically laminated films comprising 3–5 layers, one of which is a polyvinylidene chloride type resin (hereinafter referred to as PVDC) as an oxygen gas barrier layer and having a total thickness of 40–80μ are well known in the art. Typical laminated films which are currently commercially available include, for example, a laminated cylindrical film comprising 3 layers of an ethylene-vinyl acetate copolymer resin (hereinafter referred to as EVA) at the exterior side of the cylinder/a PVDC/a cross-linked EVA at the interior side of the cylinder according to Japanese Patent Application Publication No. 43024/83 (U.S. Pat. No. 3,741,253); a laminated cylindrical film comprising 3–5 layers of a specific polyolefin resin blend at the exterior side of the cylinder/a PVDC/a specific polyolefin resin blend at the interior side of the cylinder according to Japanese Patent Application Publication No. 40988/85 (U.S. Pat. No. 4,390,587); and a laminated cylindrical film comprising 4–5 layers of an EVA/a PVDC/an ionomer resin at the interior side of the cylinder according to Japanese Patent Application Publication No. 2192/80 (U.S. Pat. No. 4,161,562). These laminated cylindrical films have occupied the market share as the packaging materials used for packaging in tight irregularly shaped fatty foods as contents by heat shrinking by proposing as the sales point their unique advantages such as excellent appearance owing to their transparency, their heat shrinkability at low temperature which will not damage the freshness of contents, excellent handling and working properties and the like.

However, with the proceeding of the improvement of packaging efficiency by the introduction of high speed packaging technique using a rotary chamber vacuum packaging machine, new problems of quality have happened in the packaging field, which problems are those of quality of design and cannot be solved with the aforementioned packaging materials.

In other words, as the result of research of the present inventors, the applicability of the high speed packaging technique may be decided by the following three points; first of all, possibility of making a certain sealed part having oil resistance while shortening the time required for tight sealing of packing bags filled with contents under reduced pressure; secondly, securing the cruel treatment resistance of the films so as to resisting rough handling of packaged articles accompanied with the increase of packaging speed under severe conditions; and third, enhancement of oil resistance of interior and exterior layers, in particular, on the treatment at high temperature. In addition, these new quality requirements must be satisfied without damaging the conventional quality level and is also in a high level.

Specifically, referring to the cruel treatment resistance as an index of causing no failures such as pin hole or break of bag on handling of a package, the requirement level has been raised and a commercially available film comprising EVA/PVDC/crosslinked EVA which has been evaluated to have a toughness to ensure that the film can be used for direct packaging of meat with sharp bone at the initial application (see the effect of Japanese Patent Application Publication No. 43024/83) is now evaluated in the new market requirements to be insufficient in toughness owing to high incidence of failures such as pin hole or break of a sealed part during handling the film even if the content is changed to meat without bone so that sharp extrusion will not be detected in it on touching with hand.

However, these films are not easily modified or improved. The reason depends on that a PVDC layer as a core layer will be yellowed or deteriorated upon irradiation of electron rays and thus it is difficult to carry out crosslinking in a state of a laminate, which makes it impossible to employ coextrusion technique excellent in interlaminar strength. Furthermore, it is very difficult to form a cylindrical coextrusion laminate using the PVDC layer and finally to make a laminated film the exterior surface side of which is crosslinked There has also been proposed a non-crosslinked resin obtained by the examination of resin species to be used and its laminate construction, but the counterproposal is inferior in effect to that of using a crosslinked layer which improves both film forming property by drawing and film property itself. Accordingly, a laminated film containing as a modifying layer a polyolefin type resin layer having a sufficient degree of crosslinking must be prepared by the method such as described in FIG. 1 of U.S. Pat. No. 3,741,253, in which a cylindrical EVA layer is extruded and crosslinked with radiation, a PVDC layer and an EVA layer are cylindrically extruded sequentially on the EVA layer, and these layers are melt-extruded from a coating die in the outside of the die to form a directly adhered laminate with each other, which is drawn by an inflation method to form a cylindrical laminated film. This method has disadvantages in that it is not economical as it requires a technique of a high order and that the crosslinked layer of the film obtained will be an innermost layer of the cylindrical film.

As disclosed in Japanese Patent Application Kokai (Laid-Open) No. 23752/87 (by virtue of a right of priority based on U.S. patent application No. 735,082/85), the method of irradiating electron rays over the whole layers of a laminated film which has been prepared by coextrusion and drawing may be appreciated in the point that an effect of crosslinking-drawing is abandoned and both the modificating effect of crosslinking on the polyolefin type resin and the improving effect on the bonding between the polyolefin type resin and the PVDC layer are utilized. But the method has disadvantages that the PVDC layer is inevitably deteriorated by the irradiation of electron rays (lowering of oxygen gas barrier properties) and that the effect of crosslinking-drawing to be abandoned is very large. Further, it has been confirmed that in the laminated film obtained by irradiating the whole layers typified by the films disclosed in Japanese Patent Application Kokai (Laid-Open) No. 143086/76 (U.S. Pat. No. 4,044,187) and U.S. Pat. No. 3,821,182 the PVDC layer is deteriorated drastically (see Tables (4 and 5).

DISCLOSURE OF INVENTION

The object of this invention from this viewpoint is to provide a cylindrical laminated film which satisfies the aforementioned new required quality, that is to say, the film in which most of the evaluation items listed in Table 11 is maintained in high levels, characterized in that the yellowing or deterioration of the core layer of a cylindrical laminated film which has a PVDC layer as the core layer and is obtained by coextrusion is minimized to form a laminated film in which the exterior side of the cylinder is modified by crosslinking and the layer construction is adjusted to the optimal. In other words, The object of this invention is to provide a heat shrinkable cylindrical laminated film having a polyvinylidene chloride type resin (I) as a gas-impermeable (i.e. oxygen barrier) core layer, on the both surface sides of which 1 or 2 resin layers are arranged respectively and consisting of 3-5 layers total, characterized in that the cylindrical exterior surface resin layer on said layer (I) comprises a crosslinked polyolefin type resin layer (II) having a gel fraction [x] at the outermost layer of 25-70% by weight, a gel fraction [y] at the surface layer contacting the side of the layer (I) of 40% by weight or less and a gradient of gel fraction represented by [y/x] of 0.6 or less and the joint of said layers (I) and (II) comprises a laminate joint in a crosslinked or almost crosslinked state by electron rays.

BRIEF EXPLANATION OF THE DRAWINGS

FIGS. 6, 8 and 9 are respectively graphs illustrating the experimental results referring to the effects of irradiation of electron rays.

BEST MODE FOR CARRYING OUT THE INVENTION

Figure 1:
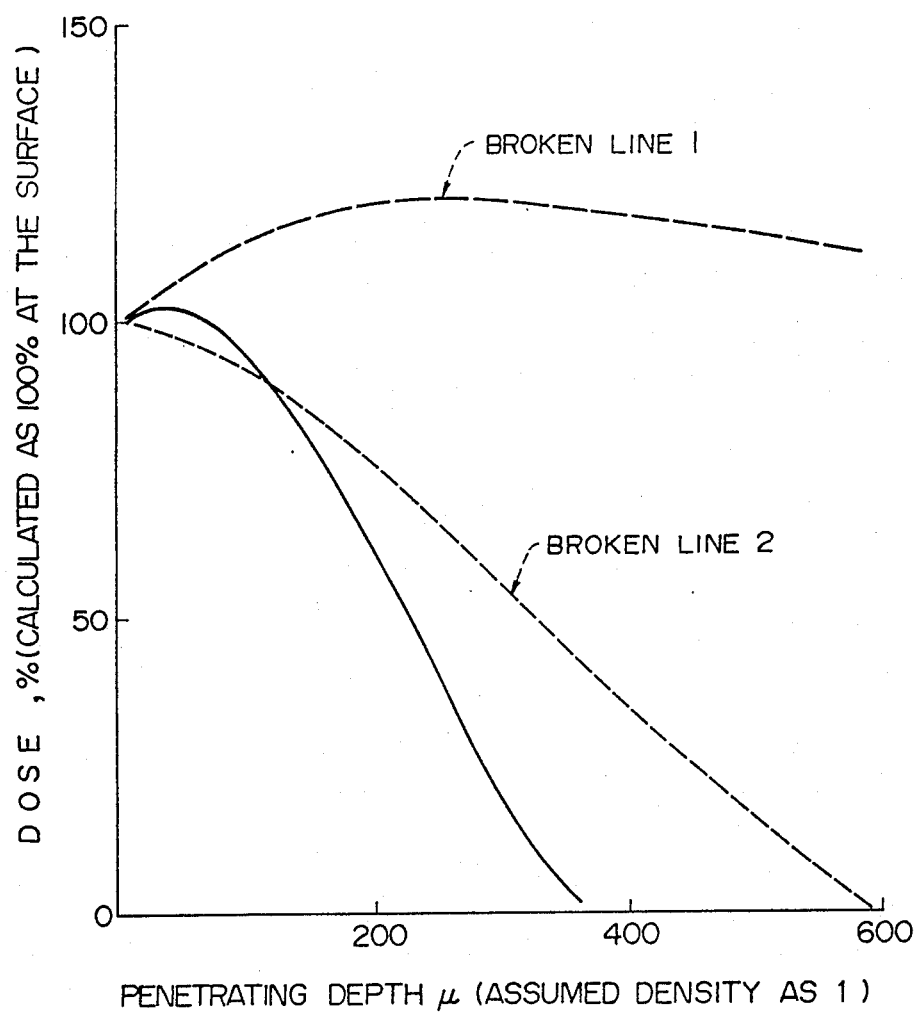
FIGS. 1, 2, 3-A, 3-B and 4 are respectively graphs illustrating the experimental results referring to doses of electron rays.

This invention is now described in detail referring to the drawings and the tables. First of all, this invention is explained from the aspect of the process for preparing the laminated film of this invention as a new laminated film, whereby the source of its novelty will be understood more readily.

The process for preparing the laminated film of this invention typically includes the crosslinking-drawing method by (i) forming a cylindrical laminate by a coextrusion method, (ii) irradiating electron rays for the exterior surface of the cylindrical laminate, and then (iii) drawing the irradiated laminate to utilize the crosslinking-drawing effect. The process is characterized in that the electron rays are irradiated into the layer (II) at the exterior surface side of the cylinder so as to afford a crosslinking (gel fraction) gradient and thus to provide subject sufficient crosslinking of the layer (II), while denaturation by electron rays is caused also at the joint area of the layer (II) and the core layer (I) but the radiation has been attenuated to give a small exposed dose to the core layer (I).

Figure 8:
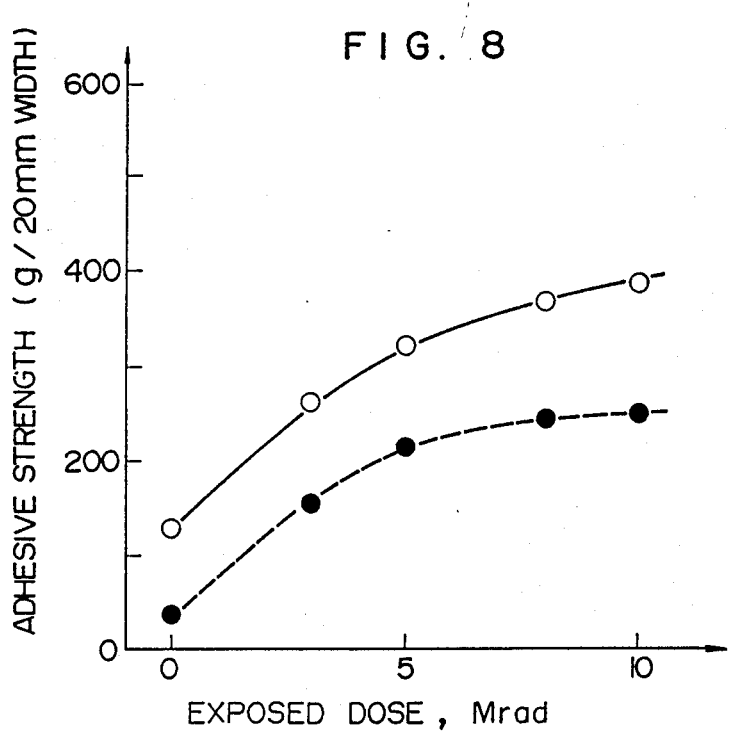

The reason is illustrated in FIG. 9 (corresponding to Experimental Example 1) and in FIG. 8 (corresponding to Experimental Example 7). That is to say, FIG. 9 shows a conceptional curves illustrating the relationship between the exposed dose of electron rays to the film and the (positive or negative) effect afforded by the irradiation (crosslinking), in which the axis of abscissa represents the exposed dose (Mrad) at the surface of the film and the axis of ordinate represents the non-defective ratio of the film group. In these curves, plotting by the triangle mark, $\Delta$ indicates the factor which illustrates the degree of deterioration of the PVDC layer and is represented by the level of non-defective barrier ratio of the film group upon repeated flexing with twisting, and the plotting by the circle mark $\bigcirc$ indicates the factor which illustrates the degree of toughness of the crosslinked-drawn film and is represented by the level of non-defective ratio of the film having a high temperature resistance on sealing of the film. The empty marks indicate the case carried out according to the process of this invention and the blackpainted marks indicate the case carried out according to a conventional process (total layer irradiation).

From the result illustrated in FIG. 9, it can be understood that in the conventional (blank-painted) process the crosslinking effect rapidly increases from about 4 Mrad and reaches the maximum level at about 6 Mrad, but the deterioration of PVDC increases markedly from about 2 Mrad and the half of the PVDC will exhibit defectiveness in oxygen gas barrier property even at an exposed dose of about 3 Mrad in which the aforementioned crosslinking effect does not appear, so that it is impossible to select any appropriate range of exposed dose in which irradiation (crosslinking) effect can be taken without the deterioration of the PVDC layer.

On the other hand, FIG. 9 indicates that according to the process of this invention (plotting with empty marks), development of the crosslinking effect remains at a low level and exposed dose of about 7-10 Mrad is required for obtaining the crosslinking effect at a maximum level, but the deterioration of the PVDC at the same dose level is also reduced remarkably, so that it is possible to select an appropriate range of exposed dose for holding the deterioration of the PVDC layer at a minimum level while maintaining the crosslinking effect at a high level.

FIG. 8 is a graph obtained from experiments for illustrating the improvement of adhesion strength between the core layer and the adjacent layers to the exposed dose. Plotting by empty circles $\bigcirc$ represents the result obtained by the process of this invention and plotting by black-painted circles $\bullet$ represents the result obtained by the conventional process (i.e. the process for adhering the adjacent layers immediately after irradiation).

To be noted amongst the results of FIG. 8 is the phenomenon of increasing the difference of effects between both curves accompanied with the increase of the exposed dose. In other words, even if the difference of the adhesion strength inherently present between both curves (as compared with each other at the exposed dose of 0 Mrad) be the one generated by the difference of the melt-extruded coating method (a layer is melt-extruded from a coating die onto a tube and directly adhered to a tube in the outside of a die; hereinafter referred to as melt-extruded coating method) and the co-extrusion method as is generally recognized, it can be considered that the increase of the adhesion strength at the neighborhood of the exposed dose of 7-10 Mrad is one of the great effects brought about by the process of this invention which makes it possible to apply the exposed dose of 7-10 Mrad without the deterioration of the PVDC layer. The improvement of adhesion strength between layers is presumably attributed to the crosslinking generated between layers in some degree. Accordingly, probability of the crosslinking reaction will be increased in proportion to the exposed dose passing through the joint portion. Therefore, if the irradiation of electron rays onto the layers which have been tightly bonded to each other and the adhesion of layers after the irradiation are compared, the probability of crosslinking between the joint portion will be apparently larger in the former than in the latter. The difference of the two curves in FIG. 8 should be noted as an index of the aforementioned phenomenon.

The phenomena illustrated in FIGS. 8 and 9 is the ones which have successfully been utilized for the first time by the process of this invention. Therefore, the laminated film prepared according to the process of this invention is a cylindrical laminated film having a variety of properties that the exterior layer side of the cylindrical laminated film is first of all modified by crosslinking and the degree of the crosslinking (exposed dose) is sufficient to carry out the modification by crosslinking-drawing of not only the exterior layer itself but also the other layers which will be modified together with drawing of the exterior layer, while most part of the PvDC layer as the core layer is not deteriorated to ensure that the oxygen gas barrier property after flexing with twisting is maintained and the PVDC layer and the exterior layer are bonded satisfactorily. FIGS. 8 and 9 also illustrate the aforementioned facts.

Next, this invention will be explained referring to the prevention of the deterioration of the PVDC layer as the core layer in spite of the irradiation of electron rays onto the exterior layer of the cylindrical laminated film of this invention.

FIG. 1 (corresponding to Experimental Example 2) is an experimental graphs of dosage distribution of an electron rays irradiation apparatus, and the axis of ordinate represents dose (%) and the axis of abscissa represents the penetrating depth of electron rays ($\mu$). The solid line represents the result with the apparatus used in this invention, the broken line 1 represents the result with a conventional scanning electron rays irradiation apparatus having an acceleration voltage of a high voltage and the broken line 2 represents the result by adjusting the broken line 1 to a maximum.

As apparent from FIG. 1, the irradiation apparatus used in this invention is modified in many points of irradiation method, titanium foil, its cooling method and the like to ensure that electron rays will not penetrate a deep point of the film.

Figure 2:
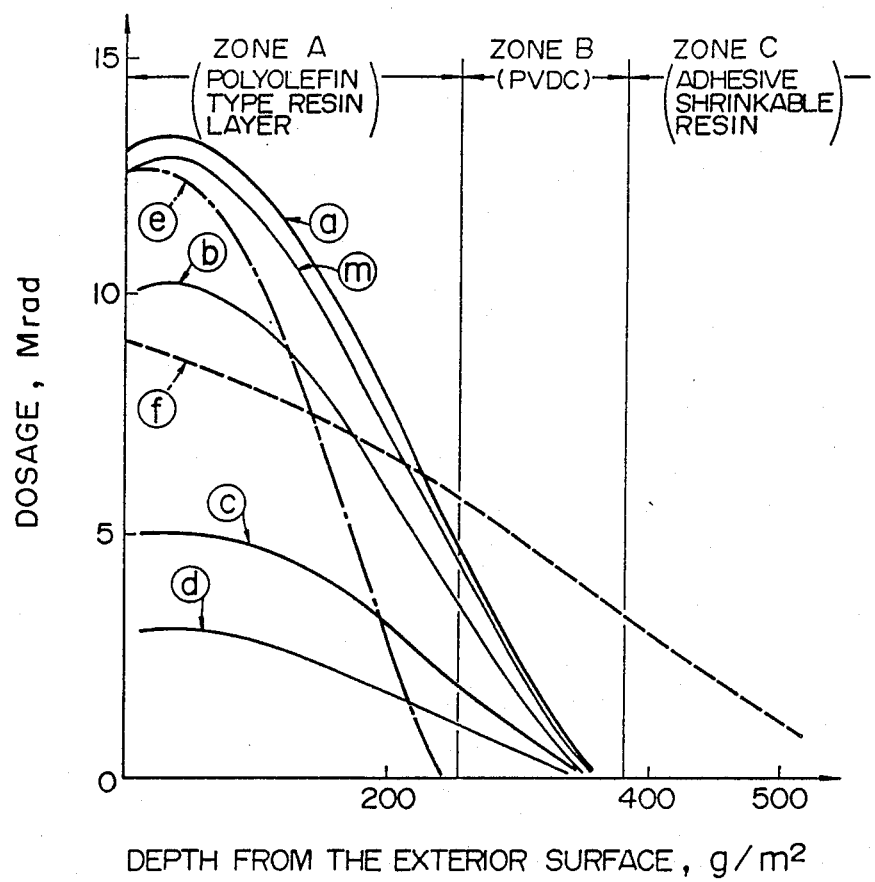

FIG. 2 (corresponding to Experimental Example 2) represents a schematic diagram for illustrating the application method of dosage distribution of the solid line in FIG. 1, in which the axis of ordinate represents the exposed dose of electron rays (Mrad) and the axis of abscissa represents the enlarged thickness in a sectional direction of a film. That is, the figure represents structural conception of the zone A as the surface layer of a polyolefin type resin layer (II), the zone B as the PVDC layer (I) and the zone C as a part of the adhesive shrinkable resin layer (III), respectively. Seven curves ⓐ, ⓜ, ⓑ, ⓒ, ⓓ, ⓔ and in ⓕ in FIG. 2 represent the results obtained by the irradiation of electron rays having a variety of dosage distribution in relation with the aforementioned film thickness. The curves ⓜ, ⓑ and ⓒ illustrate the results obtained by using the film of this invention, and the curves and ⓐ, ⓓ, ⓔ and ⓕ illustrate the results obtained by using a referential article. In other words, the dosage distribution in the film of this invention may be illustrated by the curves which are attenuated obliquely within the surface layer and the terminal parts of the curves pass across the adhesion part of the surface layer and the core layer and penetrate the PVDC layer. However, in the case illustrated in FIG. 2, the terminal parts presumably remain in substantially central part of the PVDC layer and will not reach the adhesive shrinkable resin layer. Accordingly, it can be considered that the dosage accepted by the surface layer of the laminated film of this invention is sufficient to improve the drawing sate of the polyolefin type resin and also sufficient even at its adhesion part with the PVDC layer to improve the adhesion strength of the two layers, while the PVDC layer will accept the dosage as low as one third of that in the surface layer and thus the deterioration of the PVDC layer is controlled to the minimum.

This is to say, this invention is accomplished by conducting researches about the relationship of the dosage level and the distribution profile of the dosage in the direction of the thickness so as to satisfy the required quality of the film from the standpoint of advantages and disadvantages of the polyolefin type resin layer and the PVDC layer.

Figure 3A:
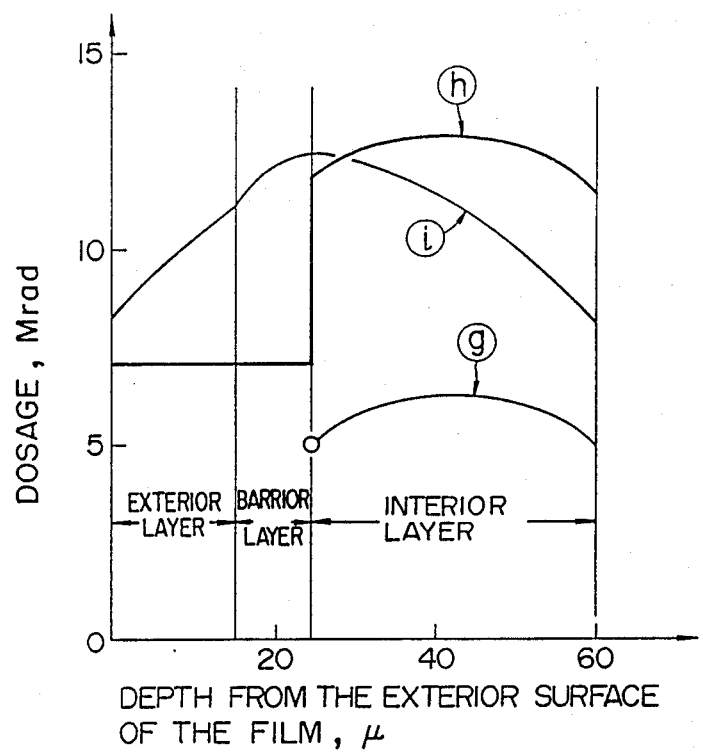
Figure 3B:
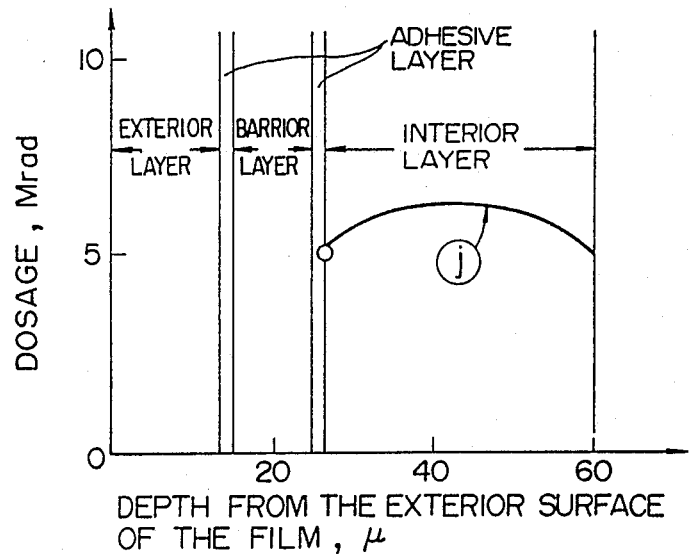

FIGS. 3-A and 3-B (corresponding to Experimental Example 4) are experimental diagrams illustrated in the same manner as in FIG. 2. In these figures, dosage distribution of a crosslinked film by the irradiation of electron rays which film has hitherto been proposed as the prior invention, in which the films obtained in the case of dosages of ⓖ-ⓙ are comparative products corresponding to those of this invention. In addition, the results of evaluation of the films illustrated in FIGS. 2, 3-A and 3-B are listed in Tables 2 and 5 to confirm the excellent properties of the film of this invention.

Figure 4:
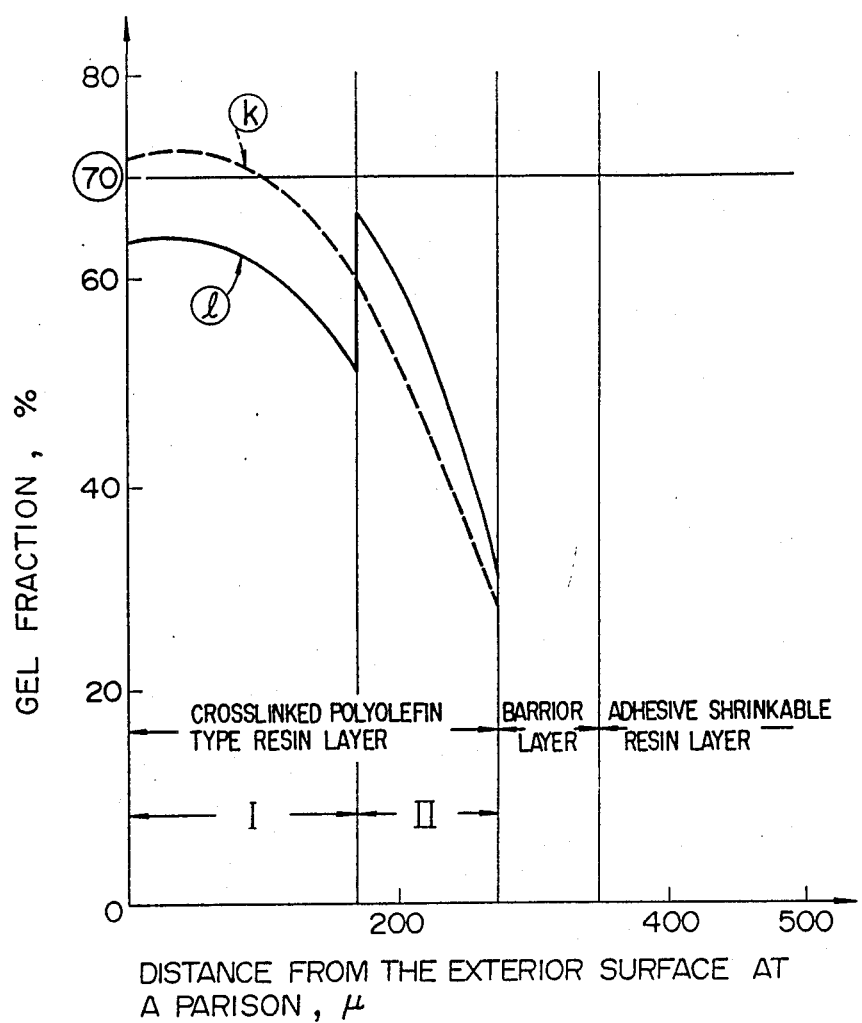

FIG. 4 (corresponding to Experimental Example 5) is a schematic diagram illustrating this invention which is created to adjust the contradictory requirements that the deterioration of film formability accompanied with excessive crosslinking should be avoided and that the degree of crosslinking of the whole layers should be maintained in a high level, in which the axis of abscissa represents thickness of the film and the axis of ordinate is the degree of crosslinking (gel fraction).

FIG. 4 illustrates the effect of a crosslinked polyolefin type resin layer which comprises the lamination of two polyolefin type resins having different crosslinking efficiencies, one of which resins having a lower crosslinking efficiency is used as an exterior surface.

In this case, the broken line illustrated in the left upper part of the figure represents the crosslinking profile of the polyolefin type resin layer comprising only one resin layer having a moderate crosslinking efficiency, which profile exceeds the limitation for easy film formation by drawing (partial gel fraction of 70% by weight) and enters into the region of defective film formation. But if an outermost layer having a lower crosslinking efficiency (i.e., having a lower gel fraction at the same dosage as above) is further laminated on the polyolefin type resin, the crosslinking profile does not enter into the region of defective film formation as is illustrated by the solid line. In this case of the crosslinking profile illustrated by solid line an internal surface layer having a higher crosslinking efficiency (i.e., having a higher gel fraction at the same dosage as above) is further arranged to ensure that the whole degree of crosslinking of the crosslinked polyolefin type resin layer will be substantially in the same level as of the resin layer having a moderate degree of crosslinking.

The laminated film of this invention is a novel film which has been accomplished on the basis of information of the irradiation method of electron rays and the layer construction which are illustrated in FIGS. 1-4 and Tables 1 and 2.

The usefulness of the film will be explained with reference to the features of the production process of the film of this invention and the films of this invention prepared according to the features, that is, the scope of claims of this invention.

Figure 5:
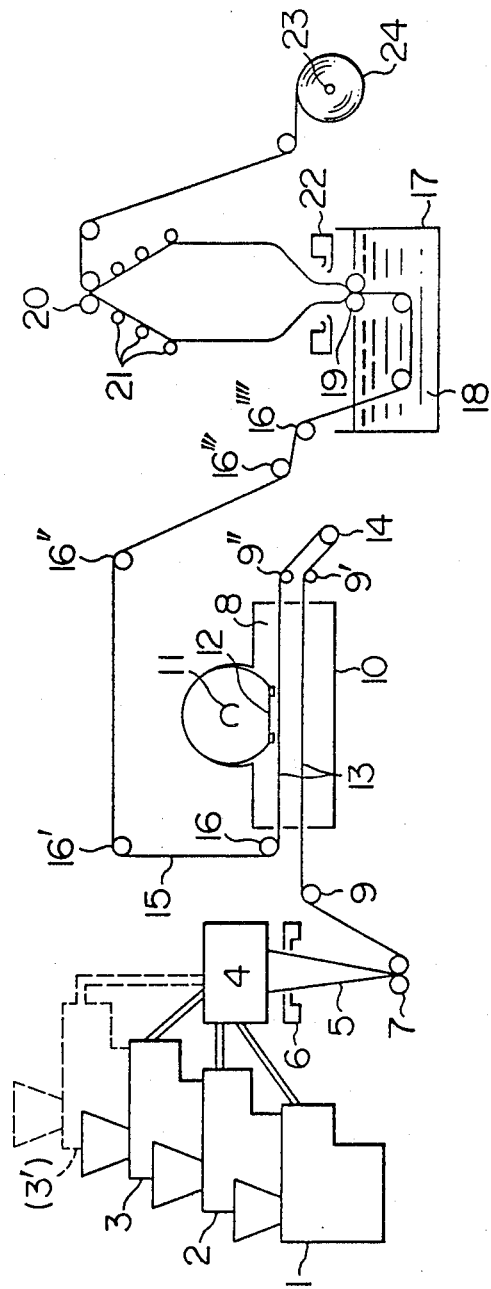
FIG. 5 is a schematic chart illustrating a manufacturing process of the film of this invention.

FIG. 5 is a schematic diagram of production process of the film of this invention.

Referring to the production example of the film of this invention, respective layer constructing resins having been molten in three or four extruders 1, 2 and 3 (and/or 3') are introduced into a circular die 4 to form a laminate and coextruded as a laminated cylindrical parison 5. The cylindrical product 5 is rapidly cooled sufficiently with a cooling apparatus 6, folded into a plain plate with pinch rolls 7 and introduced into electron beam irradiation chamber 8. Numerical marks 9, 9' and 9" represent a group of guide rolls.

Within the irradiation apparatus 8 protected with lead plates 10 or the like, the surface side of said parison plate 13 is directly irradiated with electron rays generated from the electron beam irradiation apparatus 11 through a titanium foil 12. The parison 13 is turned around with a turning roll 14 so that the traveling position will be changed on going and coming and both the surface and back of the parison will be continuously crosslinked by irradiation of electron rays.

The crosslinked parison 15 is introduced into a heating bath 17 by the group of guide rolls 16-16'''', heated to a temperature of about 60°-98° C. with a heat transfer medium 18, subjected to inflation biaxial orientation accompanied with cooling with a air blast cooling ring 22 at a position between a group of pinch rolls 19 and 20, flexed into a flat film by a deflator 21 and batched on as a flat cylindrical film 24 to a rolling axis 23.

During a series of this production process, it is basically distinguished from the conventional process (e.g., a process disclosed in U.S. Pat. No. 3,741,253) that the laminated cylindrical product having the PVDC layer as a core layer and formed by co-extrusion is directly irradiated with electron rays from not the interior but the exterior surface of the cylinder to obtain a cylindrical laminated film, the exterior surface of which has been crosslinked.

Accordingly, it is a main claim that the subject matter of this invention is intended to express the process of denaturation by crosslinking which is distinguished from the conventional technique in the Points that in the form of a laminated film without having been crosslinked prior to lamination effect of modification by crosslinking (denaturation) is utilized, while the deterioration of the PVDC layer is reduced to the minimum, by the degree of denaturation by crosslinking (gel fraction) [y] at the surface layer part of the crosslinked polyolefin type layer (II) in the core layer (I) side, the degree of the denaturation by crosslinking (gel fraction) [x] at the exterior surface layer part of the same resin layer and the gradient of the gel fraction [y/x]. The aforementioned relationship is listed in Table 2 corresponding to Experimental Example 2 and in Table 14 corresponding to Experimental Example 5. However, as a general principle, said [y] having a value exceeding 40% by weight is excluded from the object of the experiment in this invention. The reason is that even if the gradient of the gel fraction [y/x] may be changed, the PVDC layer of the core layer is deteriorated too much to match the object of this invention. Such a phenomenon can be inferred, for example, from respective curves in FIG. 2. Accordingly, said [y] should be a little value of 40% by weight or less, but it does not include the gel fraction of less than 0.5% by weight and having substantially no difference with that of uncrosslinked article. In order to increase adhesion force between the surfaces of said layer (II) and the (I), it is important to carry out denaturation by electron rays (which will be recognized, for example, by the improvement of adhesive strength) while maintaining the surfaces in contact in tight to each other, and thus said [y] will not be 0.5% by weight or less.

As apparent from Tables 2 and 14 under such conditions, if the value of [x] exceeds 70% by weight, film formability by drawing is damaged. If the value is less than 25% by weight, heat resistance of the film is not satisfactory. In addition, even if [y] is 40% by weight or less and [x] is in the range of 70-25% by weight, the PVDC layer will be extensively denaturated on the gradient represented by [y/x] being larger than 0.6. From the results of No. 141 in Table 14, practical availability of the film on the gradient of 0.6 is proved.

When the crosslinked polyolefin type resin layer (II) has an average gel fraction in the range of 20-60% by weight and a ratio of layer thickness in the proportion of 25-65% to the total film thickness, preferred degree of crosslinking for exhibiting the crosslinking effect is typified by the results listed in Table 6-A (corresponding to Example, Comparative Example 1).

That is to say, as the advantage of crosslinking of the polyolefin type resin layer (II), first of all, drawing ability of itself is improved and then properties relating to toughness such as heat resistance, oil resistance, falling bag resistance at lower temperature and the like will be improved. The enhancement of the drawing ability controls the film formability of the whole laminated film. Thus, the sealing resin layer (IV) and the PVDC layer (I) which will not be uniformly drawn with ease are oriented in high degree and uniformly, and high heat shrinkability and mechanical properties are given to the whole laminated film.

The relationship of sample Nos. 1-9 in Table 6-A indicates that in order to improve the properties mentioned above the average gel fraction is preferably in the range of 20-60% by weight and the ratio of the thickness as a layer is preferably in a proportion of 25-65% of the total thickness of the film.

In this case, electron rays directly irradiated from the surface side of the laminated film often makes the exterior surface layer of the crosslinked polyolefin type resin layer (II) in an excessive gel fraction to damage the film formability by drawing. It is not easy to increase only the film formability by drawing without decreasing the gel fraction of the whole layer (II). As a countermeasure against the problem, there is proposed a method utilizing a phenomenon illustrated in FIG. 4, in which the aforementioned layer (II) has a double layer structure constructed from two resin layers, the crosslinking efficiencies of which are different from each other, and one of the resin layers having an lower crosslinking efficiency is arranged as the outermost layer.

As another embodiment, the cylindrical film of this invention is a film having excellent interior sealability and high heat shrinkability. Thus, a useful layer construction in the cylindrical interior side is required. The adhesive shrinkable resin layer (III) has a role for adhering the sealing resin layer (IV) and the core layer (I) in tight and for controlling the heat shrinkability of the whole laminated film, particularly heat shrinkability at low temperature in cooperation with the crosslinked layer at the surface side. EVA is generally used in order to carry out the role. It is preferred to use an EVA having a vinyl acetate content in the range of 13–20% by weight as the adhesive shrinkable resin layer (III), which is apparent from the relationship between the vinyl acetate content and adhesion strength as illustrated with the curve plotted with empty circles ○ in FIG. 6.

A further embodiment is the employment of a preferred resin species as the surface layer of the aforementioned sealing resin layer (IV). This selection of the species will lead to another remarkable effect exhibited by the film of this invention, and thus the selection of the resin species therefore is explained in detail below.

The remarkable effect exhibited by the film of this invention is an effect for improving the sealing performance which is exhibited by the combination of a surface crosslinking resin layer and a sealing resin layer. Specifically, it is a combination of two main effects of the effect for satisfying the requirements for reducing the time needed to accomplish sealing and improving packaging ability and the effect for enlarging the range for suitable sealing and thus reducing extensively the reject rate of sealing on practical use.

The effect may be further divided depending on the selected sealing resin layers into a property group for providing a sealing part excellent in fusing ability accompanied with oil resistance and heat resistance or a property group for providing a film excellent in low temperature heat shrinkability, and the effect for improving the sealing performance which is common in both property group should be noted.

The sealing mode on packaging in the art comprises first conducting sealing by heat fusion of the opening part of a cylindrical bag having a content under a state to ensure that reduced pressure is accomplished also within the bag in a vacuum chamber and then pressure in the vacuum chamber is raised up to atmospheric pressure. At this time, the bag is deformed and contacted tightly to the content by the pressure of air so that the profile of the external shape of the content will appear clearly, and such deforming force will act to deform or break the unsolidified part of the aforementioned sealing by heat fusion. A period of time sufficient for solidifying the fused seal is incorporated in a time required for sealing in the art. The time required for sealing reached about 25% of the total time required for packaging.

In the packaging by sealing in the aforementioned fashion, the film of this invention has preferably a heat resistant crosslinked polyolefin type resin layer arranged on the surface layer in the side in which the film touches directly a sealing bar and a resin heat fusible at low temperature arranged on the interior surface sealing resin layer which will control the substantial fusing. That is to say, it may be considered ideal to produce the relationship that even if the interior surface side reaches the heating temperature where fusing proceeds satisfactorily, the surface layer is scarcely molten or at least does not reach such a heated state as to press a fluidizingly deformed grooved damage by the heat sealing bar.

In other words, specifically in the case of this invention, even if, for instance, a crosslinked ethylene-vinyl acetate copolymer is used as the surface resin layer, there can be approached the aforementioned ideal by utilizing directly the very non-fluid property of the crosslinked resin even if the resin reaches the temperature at the upper limit where it can keep heat resistance, that is, the temperature exceeding the crystalline melting point. When a crosslinked ethylene-α-olefin copolymer having a high crystalline melting point such as 120° C. or more, it will be easier to form the aforementioned state by the increased difference of the crystalline melting point as compared with that of a resin used as the sealing resin layer as well as the increased heat resistance of the aforementioned crosslinked resin (corresponding to sample No. 28 in Example, Comparative Examples 1 and 2).

Therefore, it corresponds to the use of sealing condition at relatively low temperature condition side for the surface layer among the sealing resin layer within the integral laminated film. Accordingly, the sealing part solidifies at least at the surface side by cooling in a short time, resists the film deforming force applied on raising the pressure again up to atmospheric pressure and reduces extensively a period of time required for solidification by cooling. That is the so-called "reduction of sealing time" herein used and leads directly to the reduction of the time required for packaging.

In the same manner, "reduction of reject rate of sealing" herein used will be explained below. Generally, film fusing at a sealing part is preferably carried out between two flat films positioned opposedly. However, the opening parts of bags continuously conveyed are not always a pair of flat films but rather folded in small wave shapes, and sealing is often carried out in such a state as to press directly the folded films. Therefore, the sealed part will inevitably cause the increased reject rate of sealing such as break of vacuum.

To the contrary, if the sealing resin layer of the film of this invention has a range of suitable fusing at a lower temperature as mentioned above, the shape of the surface side of the film is maintained by the aforementioned heat resistance, so that the folded sealing part even around the center is satisfactorily within the temperature range of compatible fusing and sealing pressure is also applied to the part. Consequently, the condition for suitable sealing of the sealing resin is satisfied and the tight sealing between the sealing resin layers proceeds.

Figure 7:
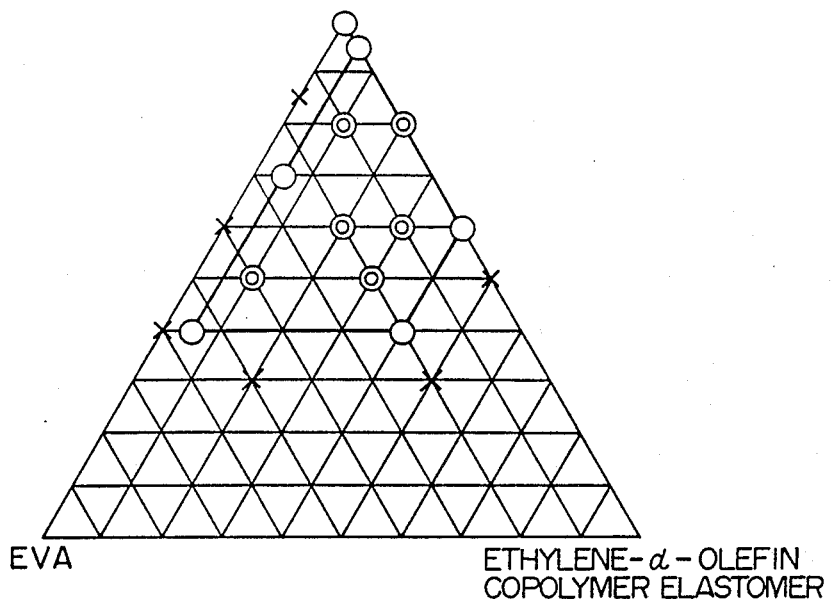
FIG. 7 is an analytical diagram illustrating the component of the sealable resin layer in the film of this invention.

FIG. 7 corresponding to Example, Comparative Example 2 is a diagram from which a resin used as the aforementioned sealing resin layer is judged and also a demonstration of the preferred embodiment of this invention.

In FIG. 7, the regions illustrated by the plotting with marks or generally correspond to the regions of the resin species and the composition useful for "reduction of the time required for sealing" and "reduction of reject rate of sealing" provided that the aforementioned surface layer is used. Further, the diagram indicates that the region is a part represented by any one of the resins of an ethylene-α-olefin copolymer resin (resin A) having a density of 0.88–0.93 and a crystalline melting point of 110°–130° C., a mixed resin comprising 60% by weight or more of said resin A and 40% by weight or less of an ethylene-α-olefin copolymer elastomer (resin B) or a mixed resin comprising 40% by weight or more of said resin A, 5-40% by weight of said resin B and 55% by weight or less of an ethylenevinyl acetate copolymer resin (resin C), in which the percentages of the components in said mixed resins amount to 100% in total.

Figure 6:
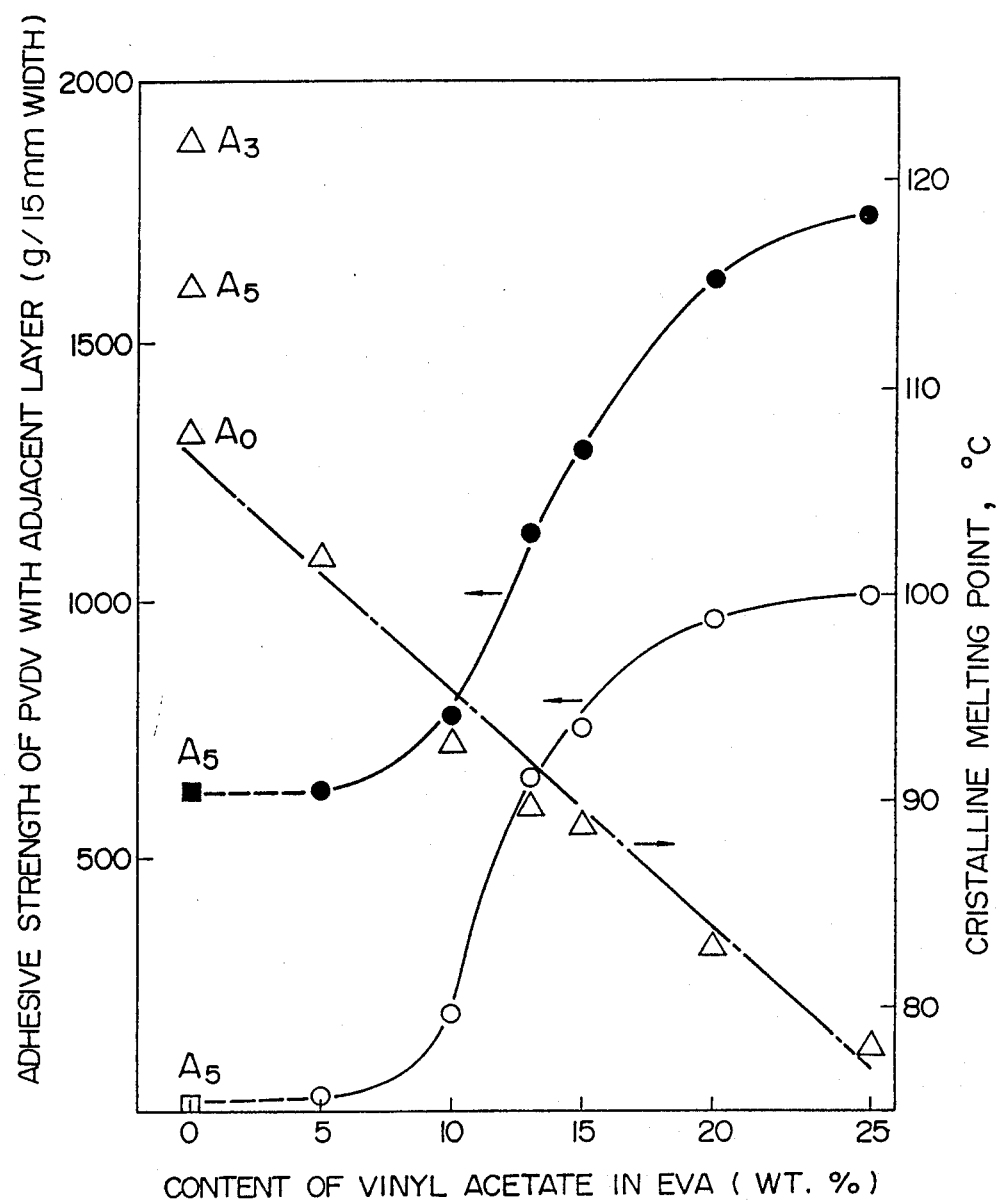

FIG. 6 corresponding to Experimental Example 6 illustrates the results from the experiment for reexamining the aforementioned resin as the surface layer from another standpoint that when the PVDC layer is used as the core layer, the resin maintains the essential adhesive strength with the core layer. That is, in FIG. 6, the axis of abscissa represents the vinyl acetate content (% by weight) in the resin, the axis of ordinate in the left side represents the adhesive strength with PVDC (g/15 mm of width), and the axis of ordinate in the right side represents the crystalline melting point (°C.) of the resin. Plotting with empty circles ○ (co-extruded and un-crosslinked) and black-pained circles ⊙ (co-extruded and 5 Mrad dosed) represent the relationship between the vinyl acetate content and the adhesive content, and plotting with triangles Δ represents the relationship between the vinyl acetate content and the crystalline melting point, respectively. At the parts corresponding to 0% of the vinyl acetate content, three ethylene-α-olefin copolymers having different crystalline melting points are applied to $A_0$, $A_3$ and $A_5$.

Difference between the two kinds of circles ○ and ⊙ in FIG. 6 represents the increase of adhesive strength at the bonded part with the PVDC layer. Crosslinking efficiency at a constant dosage is generally considered to be proportional to the vinyl acetate contents. Accordingly, there can be anticipated in principle with the phenomenon that adhesive strength increases in the region of the vinyl acetate of 13% by weight or more in FIG. 6. However, it is extraordinarily found that the increase of the adhesive strength in the side of the lower vinyl acetate content of less than 13% unexpectedly corresponds in its absolute value of the adhesive strength with the increase shown by the uncrosslinked EVA having a vinyl acetate content of about 13-20%.

The aforementioned phenomenon is effectively utilized in this invention. In other words, in order to maintain the adhesive strength of PVDC with a core layer, it is generally considered necessary to use a specific resin such as EVA, EEA (polyethylene ethyl acrylate), EAA (polyethylene acrylic acid) and the like as an adhesion layer or as an adjacent layer to the core layer. However, it is difficult to maintain the other properties such as heat resistance (crystalline melting point), oil resistance, heat shrinkability, and the like at high levels while maintaining the adhesive strength according to the conventional technics. Therefore, if heat resistance at a higher temperature side exceeding about 90° C., it is necessary to provide a layer having a further higher melting point such as a layer of an ethylene-α-olefin copolymer resin or the like. But the resin is poor in the adhesive strength with the PVDC layer, and it cannot be inevitable to provide another EVA layer having a high vinyl acetate content between the surfaces of the two, which consequently limit the quality design of the whole laminated film.

The significance represented by FIG. 6 and useful in this invention consists in that even if an ethylene-α-olefin copolymer having a high crystalline melting point (vinyl acetate content, 0%) is used as a surface layer, an adhesive strength in the level of practical use can be principally obtained by providing the copolymer adjacent to the core layer, and an EVA layer having a relatively high crystalline melting point (a low vinyl acetate content) can be used on providing an adhesion layer, so that the heat resistance and oil resistance of the whole laminated film can be improved. Further, to be noted is the value of the adhesive strength increased by the co-extrusion-crosslinking in the neighborhood of a vinyl acetate content of 13-20% by weight. The high adhesive strength is an effect which could not be obtained without any deterioration of the PVDC layer, and the laminated film having a strong bonding between surface layers can be obtained. These are excellent effects produced by the crosslinking according to this invention.

A further preferred embodiment corresponds to Table 3 in Experimental Example 3 and relates to a preferred embodiment of the PVDC layer used as a core layer. This core layer controls principally the oxygen gas barrier property of the laminated film and generally arranged in a state containing a plasticizer and a stabilizer in an amount of 2-4% by weight. The core layer has a problem to lower the oxygen gas barrier property by the yellowing by the irradiation of electron rays to deteriorate or decompose the transparent quality of a content. This invention restricts the transmittance of electron rays to reduce the deterioration or yellowing to the minimum, but the deterioration or yellowing of PVDC cannot be completely avoided.

According to the result listed in Table 3, in order to eliminate the deterioration or yellowing of the core layer to the minimum, when PVDC is a vinylidene chloride-vinyl chloride copolymer, the vinyl chloride content is preferably in the range of 10-25% by weight, and when PVDC is a vinylidene chloride-methyl acrylate copolymer, the methyl acrylate content is preferably in the range of 3-15% by weight.

In general, when the level of oxygen gas barrier property is desired to be enhanced, the vinylidene chloride-methyl acrylate copolymer is preferably selected.

The b value referred herein is an index of a color tone of a PVDC layer having been processed to a thickness of 100 micron as an object and represents the value measured in accordance with JIS Z 8729. The b value of 17 or less is an upper criterion for satisfying the required quality in which the content (raw meat) within the package are looked clearly.

Another embodiment is the one which is obtained from the standpoint of economy for manufacturing a co-extruded laminated film and thus has a little different appearance from the aforementioned embodiments for satisfying the required quality at a high level.

That is to say, there have been investigated for a long time many ideas for preparing a multi-layer film in which resins compatible with the purposes of respective layers have been laminated to exhibit the best performance in laminated films. However, when the multi-layer film is processed into a laminated film by a co-extrusion method of intra-die lamination, it is uneconomical technically and thus undesirable to carry out co-extrusion of the multi-layer film comprising 6 layers or more because of the necessity of the arrangement space of an extruder and the laminating structural space within a die. Accordingly, it is also necessary to reduce the number of layers and thus the kinds of resins used or to combine two or more of the resin species of which properties are compatible with each other so that an extruder can be used for two or more layers to reduce the number of extruders used.

From such standpoint, in the film of this invention comprising laminating respective resin layers in the sequence of (II)/(I)/(III)/(IV) or (II)/(II)'/(I)/(III)/(IV), if resins in the same kind which can be commonly used for the layers (II) and (IV) can be provided with one extruder, a laminated film comprising 4-5 layers can be conveniently manufactured by 3-4 extruders. Alternately, if a resin which may be commonly used for the layers (II)' and (III) is further used, a laminated film comprising 4-5 layers can be manufactured with three extruders.

A further embodiment relates to an application most suitable to the film of this invention, the film thickness for satisfying the required quality for the application and the layer construction with the thickness (corresponding to Tables 6-A and B in Example, Comparative Example 1). As compared with the same kind of commercially available film, it can be found that the film of this invention is a film which has required main properties all in high levels and accomplishes completely the improvement of packaging performance as the required quality in current market (see table 11 for Example, Comparative Example 5).

A further embodiment relates to a preferred supplying shape of the cylindrical film of this invention. That is to say, cylindrical laminate co-extrusion is conducted, and the product is subjected to inflation orientation and directly rolled up to form a seamless cylindrical laminated film. The seamless cylindrical laminated film can be sealed tightly only by bottom sealing and top sealing. This is a desirable film because it has only two parts to be sealed and thus producing a fewer reject rate at the sealing parts. However, if the seamless cylindrical laminated film has a small diameter, the production efficiency on film formation is low and the cost will be heightened. In such a case, a wide seamless cylindrical film is first produced and folded flatly. Then, a bottom part is provided to the film so as to have a required width, and the film is cut into pieces by a side sealing method. Thus, the cylindrical laminated film having a small diameter can be economically manufactured.

Table 11 corresponding to Example, Comparative Example 5 illustrates the results of classification of the qualities and performance of the film of this invention with reference to quality level in comparison with the currently available film in the art. Table 11 also proves the property of the explanation of the contents of this invention, because almost of the items of the above-mentioned evaluations, of which items have been divided into small classes of items, are listed in combination in this table and can be evaluated in the same time.

As apparent from the results listed in Table 11, the quality level of the film of this invention typified by the sample Nos. 17 and 28 can be said to satisfy the high quality levels in many items as compared with those of commercially available films. Oil resistance, heat resistance and shrinkability also reach certain levels. It can be found more preferable to use the sample Nos. 34 and 52 for packaging processed meat which requires boiling and the sample No. 39 for packaging raw meat which needs high level of heat shrinkability at lower temperature.

The term "ethylene-α-olefin copolymer resin" having a density of 0.88-0.93 (g/cm$^3$) and a crystalline melting point of 110°-130° C." used in this invention means a copolymer resin of ethylene and an α-olefin having 4-18 carbon atoms such as 1-butene, 1-pentene 4-methyl-1-pentene, 1-hexene, 1-octene or the like.

The term "ethylene-α-olefin copolymer elastomer" means a thermoplastic elastomer having a density of 0.91-0.85 (g/cm$^3$) and a Vicat softening point (measured in accordance with ASTM D 1525 with a load of 1 kg) of 80° C. or less and a rubber-like substance of a copolymer of ethylene and an α-olefin having 3-8 carbon atoms such as propylene, 1-butene, 1-hexene, 1-heptene, 4-methyl-1-pentene, 1-octene or the like.

Further, the term "polyvinylidene chloride type resin (PVDC)" used in this invention means a copolymer resin obtained from vinylidene chloride and a monomer copolymerizable therewith (e.g., vinyl chloride, methyl acrylate or the like).

The term "gel fraction" used in this invention means a gel fraction obtained by the following operations is accordance with ASTM D 2765.

(1) A sample (ca. 50 mg) taken from a prescribed position is weighed with a balance having a presion of 0.01 mg (S g);

(2) A 150 mesh screen pouch manufactured by SUS which has preliminarily dipped into acetone for 24 hours to remove oil and the sample are weighed with the balance (W1 g);

(3) The sample is packaged with the pouch;

(4) The sample packaged with the pouch is placed in a separable flask equipped with a condenser and retained in boiling paraxylene for 1-2 hours;

(5) The sample packaged with the pouch is dried in a vacuum drier until it reaches a constant weight;

(6) The sample packaged with the pouch is weighed with the aforementioned balance (W2 g); and (7) Gel fraction is calculated by the equation of Gel fraction (% by weight) $=[1-(W1-W2)/S]\times 100$.

Attention should be paid on preparing the sample for measuring the aforementioned gel fraction with reference to the followings:

When a specific layer of a laminate is intended to use as a sample, the layer should be peeled slowly with coating ethanol thereon; and When a surface layer of a specific layer in a parison is intended to use as a sample, a piece of 10 mm×20 mm is cut from a portion of the peeled specific layer having a good flatness and the surface layer is sliced into a thickness of about 20 micron with a microtome for an optical microscope to make samples. It is also possible to slice a specific layer of an oriented film which has been peeled in the same manner as above and returned to a parison state by the heat shrinking treatment.

Evaluation methods and evaluation criteria used in this invention will be explained below.

(1) Film formability by drawing

An apparatus (or a method) illustrated in FIG. 5 was used. The pinch rolls 19 were driven at a speed of 7 m/min, and film formation by drawing was attempted in order to reach a draw ratio in machine direction to transverse direction of ¾. Evaluation was conducted with reference to the easiness of start-up of film formation by drawing, interconnected stability of a drawn bubble and thickness spots of the film obtained.

| Grade | Criteria |
|---|---|
| ⊚ | Easy start-up; good interconnected stability of bubble; thickness uniformity of film, within ±15%; |
| ○ | No problem for start-up; drawing starting position vibrated finely; thickness uniformity film, exceeding ±15% and within ±25%; |
| Δ | Start-up with difficulty; drawing starting |

| Grade | Criteria |
|---|---|
| | position is not fixed; thickness spot of film exceeds ±25%; and |
| x | Drawing with difficulty; even if drawing was conducted, undrawn part remained in a zone or bubbles were rapidly broken. |

(2) Oil resistance of interior surface

The seamless film thus produced was cut into a predetermined length, and one end thereof was subjected to heat sealing under a condition for obtaining a maximum strength to make a bag.

On the interior side of the bottom sealed part of the bag was coated lard, roast pork was pushed into the bag until it abuts against the bottom sealing, and vacuum packaging was conducted. Twenty packages thus prepared were dipped into hot water at 90° C. and taken up from the hot water with a predetermined intervals, and the oil resistance of interior surface was evaluated by inspecting the presence of break at the bottom sealing part. The oil resistance was considered good when the broken seals remain within one. This evaluation was conducted with an anticipation of the package for use of boiling processed meat.

| Grade | Criteria |
|---|---|
| ⊚ | good after 20 minutes, |
| ○ | good after 5 minutes, |
| △ | good after 1 minute |
| x | failed after 1 minute. |

(3) Oil resistance of interior surface II

After suet was coated on the interior side of the bottom sealing part of the bag, raw beef was pushed into the bag until it abuts against the bottom sealing, and vacuum packaging was conducted. Twenty packages thus prepared were passed through hot water shower at 90° C. over a period of time described below, and oil resistance of interior surface was evaluated by inspecting the presence of break at the bottom sealing part. The oil resistance was considered good when the broken seals remain within one. This evaluation was conducted with an anticipation of the package for use of chilled beef.

| Grade | Criteria |
|---|---|
| ⊚ | good after 12 seconds, |
| ○ | good after 8 seconds, |
| △ | good after 4 seconds |
| x | failed after 4 seconds. |

(4) Reduction of time required for sealing

Using the bags prepared above, the suitable condition of impulse sealing in a vacuum packaging machine was selected based on strength. Then, meat in an amount of 10-15 kg was placed in the bag, which was then placed at the position as near as possible to the sealing part of a vacuum packaging machine. Suet was coated on the interior side of a part to be sealed, and then vacuum packaging was conducted with changing the cooling time after sealing as described below. After dipping the sealed bag into hot water at 90° C. for 4 seconds, evaluation was conducted referring to break of vacuum, elongation at the sealed part, break, peeling of the surface layer of the film and the like based on the cooling time required for protecting the failure of the film. The number of packages was 30.

| Grade | Criteria |
|---|---|
| ⊚ | no failure in 1 second of cooling time; |
| ○ | failure did not disappear until cooling time was prolonged to 2 seconds; |
| △ | failure did not disappear until cooling time was prolonged to 3 seconds; |
| x | failure did not disappear even if cooling time was prolonged to 3 seconds. |

(5) Reject rate of sealing

Using the bags prepared above, a folding part (double layered part) was intentionally made on one of the films, and the condition of impulse sealing was examined required for fusing completely with involving the folding part. Then, raw meat in an amount of 10-15 kg was placed in the bag, which was then placed at the position as near as possible to the sealing part of a vacuum packaging machine. Suet was coated on the interior side of a part to be sealed, and the opening part of the bag was converged with hands and left opening to make intentionally fine flexes with twisting. Then, vacuum packaging was conducted under the condition of cooling time for 2 seconds after sealing. After dipping the packaged product into hot water at 90° C. for 4 seconds, evaluation was conducted referring to break of vacuum, elongation at the sealed part, break, peeling of the surface layer of the film and the like referring to the presence of the failure of the film. The number of packages was 30.

| Grade | Criteria |
|---|---|
| ⊚ | within 1 of failed sealing; |
| ○ | 2-3 of failed sealing; |
| △ | 4-9 of failed sealing; |
| x | 10 or more of failed sealing. |

(6) Falling bag resistance at low temperature

After the bottom sealed part of the bag prepared above was coated with suet, water in an amount of 6 kg at about 2° C. was charged into the bag. The opening side of the bag was held with hands and the bottom sealed part was dipped into hot water at 90° C. for 4 seconds. Then, the opening was closed with a string. The bag fallen from a height of 1 m onto a flat concrete surface, and evaluation was conducted based on the number of broken bags. The number of bags used in the test was 10.

| Grade | Criteria |
|---|---|
| ⊚ | within 1 of a broken bag; |
| ○ | 2-3 of broken bags; |
| △ | 3-5 of broken bags; |
| x | 5 or more of broken bags. |

(7) Oil resistance at dints

A synthetic rubber dummy (having a length and a width of 30 cm, respectively and a thickness of 10 cm, on the surface of which are arranged semispherical dints having a radius of 1.5 cm with an interval of 10 cm) was placed into a bag prepared above and packed under vacuum. After coating suet on the exterior surface, the bag was dipped into hot water at 90° C. for 4 seconds and then taken out. The presence of damages such as break or the like on the dints was examined to judge the total strength (heat resistance and oil resistance) of the film. Evaluation was carried out based on the break rate of the film.

| Grade | Criteria |
|---|---|
| ⊙ | within 10% of the break rate; |
| ○ | 10%–20% of the break rate; |
| △ | 20%–50% of the break rate; |
| x | more than 50% of the break rate. |

(8) Color tone (b value) of PVDC

After a film was shrunk at a temperature of 70° C. or more, only PVDC layers having been peeled and taken out were layered to a thickness of 100±5μ and placed on a white board. The b value was measured with a reflecting light in accordance with JIS Z 8729 to judge the color tone. A mineral oil has been coated on the interfaces between the PVDC layers. The larger the b value is, the more extensive the yellowing becomes.

| Grade | Criteria |
|---|---|
| ⊙ | 15 or less of the b value; |
| ○ | 15–17 of the b value; |
| △ | 17–20 of the b value; |
| x | more than 20 of the b value. |

(9) Transparency of the film

A film was placed on a cylinder having a bottom, the interior surface of which was lined with a black cloth for absorbing light, and the L value was measured with a reflecting light in accordance with JIS Z 8729. The larger the L value is, the more whitish the film is.

| Grade | Criteria (the L value) |
|---|---|
| ⊙ | 7 or less; |
| ○ | more than 7 and within 8; |
| △ | more than 8 and within 9; |
| x | more than 9. |

(10) Transparency of the film after shrinking

A film was dipped in a hot water bath at 90° C. for 4 seconds and shrunk under a relaxed state. After moisture on the surface had been wiped off, the haze of the film was measured in accordance with ASTM D 1003 to evaluate the transparency.

| Grade | Criteria (Haze) |
|---|---|
| ⊙ | 15% or less; |
| ○ | more than 15% and within 25%; |
| △ | more than 25% and within 40%: |
| x | more than 40%. |

(11) Heat shrinkability and heat shrinkability at low temperature

A film having been cut into a square of 10 cm in length and width was dipped in a hot water at 90° C. referring to heat shrinkability or at 75° C. referring to heat shrinkability at low temperature for about 4 seconds and shrunk under a relaxed state. The shrinkage factor was obtained by averaging shrinkage factors in length and width based on the size at initiation.

| Grade | Criteria (Shrinkage factor) |
|---|---|
| ⊙ | 30% or more; |
| ○ | 20% or more and less than 30%; |
| △ | 15% or more and less than 20%; |
| x | less than 15% |

(12) Oil resistance on the exterior surface of the film

A film was spread in tension over a wooden frame, and the exterior layer surface was coated with lard. Then, the film was dipped together with the wooden frame into hot water at 90° C. and taken out after the intervals of time mentioned below. The presence of damages such as swelling of the exterior layer, whitening or the like was examined to evaluate the oil resistance of the exterior surface of the film.

| Grade | Criteria |
|---|---|
| ⊙ | good after 20 minutes; |
| ○ | good after 5 minutes; |
| △ | good after 5 seconds; |
| x | failed after 5 seconds. |

(13) Ply separation resistance

A film as cut into a shape of about 30 cm in length and width, and lard was coated on the both exterior and interior surfaces and ends. Then, the film was dipped in a relaxed state into hot water at 90° C. for 20 minutes and then taken out. The presence of bubble-like ply separation in the film and ply separation at the end parts of the film were examined to carry out evaluation.

| Grade | Criteria |
|---|---|
| ⊙ | no separation over all surfaces of the film; |
| ○ | partial separation at the ends of the film; |
| △ | separation at the ends or partial bubble-like separation; |
| x | separation at the ends or bubble-like separation. |

(14) Maintenance rate of oxygen barrier property after flexing with twisting of the film A film was dipped in a relaxed state into hot water at 90° C. for 4 seconds and shrunk. Then, the GELBO test in accordance with MIL STD. B-131 was repeated 100 cycles at 0°–2° C., and the oxygen gas penetrating rates before and after test were measured in accordance with ASTM D3985. The penetrating rates were compared, and the strength of the PVDC layer against the flexing with twisting was judged. If the increase of the penetrating rate was within 30%, judgement of good was given. Evaluation was carried out by the percentage of good products. The number of films tested was 20.

| Grade | Criteria (defective rate) |
|---|---|
| ⊙ | within 10%; |
| ○ | more than 10% and within 25%; |
| △ | more than 25% and within 50%; |
| x | more than 50%. |

(15) Maintenance rate of oxygen barrier property after rough treatment under severe conditions A synthetic rubber dummy (having 30 cm in length and width, respectively, and 20 cm in thickness, all tops and edges of which were rounded in a curvature radius of 2 cm and on the whole surfaces of which are arranged semispherical extrusion having a radius of 3 cm with an interval of 2 cm) was packaged under vacuum with a bag prepared above and passed through hot shower at 90° C. The bag was placed into a octahedral rotary drum lined with a corrugated board. The drum was rotated 200 times at 0°-2° C. Then, the film was peeled off, and the oxygen gas penetrating rate was measured in the same manner as in (14) and used as judgement of the strength of the surface layer against rubbing with the exterior surface. The film as partly drawn by the extrusions on the dummy, so that the increase of oxygen penetrating rate within 50% of that calculated from the average shrinkage factor were judged good, and evaluation was carried out with the percentages of good products.

| Grade | Criteria (Defective rate) |
|---|---|
| ◉ | within 10%; |
| ○ | more than 10% and within 25%: |
| △ | more than 25% and within 50%; |
| x | more than 50%. |

(16) Heat resistance of films

Exterior surface side of a film spread in tension over a wooden frame was touched softly with a hot plate having a radius of 40 mm and heated to 200° C. The presence of a hole at the contact part was examined with a naked eye. The heat resistance of the film was evaluated by judging the film having no hole good and the one having a hole defective. The number of the film tested was 20. This evaluation was carried out with anticipation of checking the pinholes which tend to generate in the neighbourhood of the sealing part on sealing when the film is heated to high temperature.

| Grade | Criteria (Hole defective rate) |
|---|---|
| ◉ | within 10% |
| ○ | more than 10% and within 25%; |
| △ | more than 25% and within 50%; |
| x | more than 50%. |

Experimental Example 1

This experiment is intended to examine the effects of the dosage distribution (depth) and dose (strength of irradiation) of electron rays on the film of this invention.

In this experiment, films were prepared by changing electron beam irradiating methods and irradiation conditions with a film producing apparatus illustrated in FIG. 5, and evaluation was carried out referring to heat resistance and oxygen barrier property after flexing with twisting.

First of all, preparation methods of films are explained below. In FIG. 5, a parison comprising four layers was extruded with three extruders 1-3, drawn at a speed of about 7 m/min to make a cylindrical parison having a flat width of 115 mm. The parison comprised sequentially from its exterior side EVA (having a vinyl acetate content of 13.5% by weight)/PVDC (a vinylidene chloride-vinyl chloride copolymer resin having a comonomer component derived from the vinyl chloride monomer in the resin of 17% by weight)/EVA (having a vinyl acetate of 13.5% by weight)/a sealing resin layers, which layers had a thickness of 275μ/65μ/225μ/165μ. As the aforementioned sealing resin, an ethylene-α-olefin copolymer resin (very-low density polyethylene: density, 0.906; crystalline melting point, 118° C.; trade name, NUC-FLX manufactured by NIPPON UNICAR Co.) was used. The parison was irradiated with electron rays using an electron beam irradiating apparatus 8. The electron beam irradiating apparatus used in this experiment was two kinds of apparatuses, that is, ELECTROCURTAIN ® (non-scanning type) manufactured by ENERGY SCIENCE INC. and a scanning type electron beam irradiating apparatus manufactured by NISSIN-HIGH VOLTAGE CO. Irradiation crosslinking was carried out with changing dosages as shown in Table 12 by the use of these two electron beam irradiation apparatuses. The crosslinked parison was introduced into a heating bath 17 illustrated in FIG. 5, heated to a temperature of 80° C. and subjected to an inflation biaxial orientation treatment to draw the film to a machine direction of about 3 times and a transverse direction of 4 times, respectively, of their original sizes. The film having a flat width of 460 mm and an average thickness of about 60μ was prepared in a length of 300 m and rolled round a bobbin. For comparison, a further film was prepared without irradiation.

The start-up of drawing was accompanied with difficulty in some degrees in the case of sample Nos. 101, 108, 109, 110 and 116 in Table 12. (Difficulty was due to that these samples were irradiated only in low levels or nothing.)

Next, the film was left standing while it was rolled round the bobbin for 3 days and then unrolled into a film for 10 days at room temperature. Then, heat resistance of the film was evaluated using a part of the sample having a thickness of 60±5μ in the manner described above. A run of twenty evaluation was conducted. Also, the film was dipped in a relaxed state into hot water at 90° C. for 4 seconds and shrunk. Then, retention of oxygen gas barrier property after flexing with twisting of the film was evaluated in the manner described above. A run of twenty evaluation was conducted to calculate the non-defective rate of the film.

The relationship between samples and the irradiation conditions and the non-defective rates obtained by the aforementioned evaluation were listed in Table 12. FIG. 9 illustrates the plotting of non-defective rates to the dosages.

In FIG. 9, empty marks mean the plottings of experimental results using a modified non-scanning type electron beam irradiation apparatus which was used in this invention, in which empty circles ○ illustrate the heat resistances of films and empty triangles illustrate the oxygen gas barrier properties after flexing with twisting of films. Black-painted marks mean the plottings of experimental results using a conventional scanning type electron beam irradiation apparatus, in which black-painted circles ◉ illustrate the heat resistances of films and black-painted triangles ▲ illustrate the barrier properties after folding of films.

The dosage distribution in the direction of depth using the modified non-scanning type electron beam irradiation apparatus which was practically used in this experiment was illustrated by a solid line based on the dosage at the surface as 100% in FIG. 1. The dosage distribution using the conventional scanning type electron beam irradiation apparatus was illustrated by a broken line 1. (Measurement was described in Experimental Example 2.) It can be understood from FIG. 1 that the modified non-scanning type electron beam irradiation apparatus which was used in this invention extensively attenuated dosage at a depth of a sample and thus electron rays does not penetrate a depth of a sample.

According to the result shown in FIG. 9, in the case of the conventional method (black-painted marks) crosslinking effect increases rapidly from about 4 Mrad and reaches its maximum level at about 6 Mrad. But large dosage of electron rays is irradiated also to the PVDC layer, so that deterioration of the PVDC becomes remarkable, and a half of the PVDC becomes defective at about 3 Mrad where no crosslinking effect appears. Therefore, it is impossible to select any appropriate range of exposed dose in which irradiation (crosslinking) effect can be taken without the deterioration of the PVDC layer.

On the other hand, FIG. 9 indicates that according to the process of this invention (plotting with empty marks), development of the crosslinking effect remains at a low level and exposed dose of about 7–10 Mrad is required for obtaining the crosslinking effects at a maximum level, but the dosage irradiated on the PVDC layer is very small and the deterioration of the PVDC at the same dose level is also reduced remarkably, so that it is possible to select an appropriate range of exposed dose for remaining the deterioration of the PVDC layer at a minimum level while maintaining the crosslinking effect at a high level.

TABLE 12

| Sample No. | Electron beam irradiation apparatus used | Condition Acceleration voltage (KV) | Dosage (Mrad) | Heat resistance of film | Non-defective rate (%) Oxygen barrier property after flexing with twisting of film |
|---|---|---|---|---|---|
| 101 | Electrocur- | 200 | 3.5 | 0 | 95 |
| 102 | tain ® (non- |  | 5 | 75 | 100 |
| 103 | scanning type, |  | 6 | 90 | 100 |
| 104 | Titanium foil |  | 7 | 95 | 100 |
| 105 | modified) |  | 8 | 100 | 100 |
| 106 | manufactured |  | 10 | 100 | 95 |
| 107 | by ENERGY SCIENCE INC. |  | 12 | 100 | 90 |
| 108 | Scanning type | 500 | 1 | —*1 | 95 |
| 109 | electron beam |  | 2 | —*1 | 80 |
| 110 | irradiation |  | 3 | 0 | 60 |
| 111 | apparatus, |  | 3.5 | 55 | 45 |
| 112 | manufactured |  | 4 | 80 | 40 |
| 113 | by NISSIN |  | 5 | 95 | 15 |
| 114 | HIGH VOLTAGE |  | 6 | 100 | —*1 |
| 115 | CO. LTD. |  | 8 | 100 | —*1 |
| 116 | No dose of electron ways |  |  | 0 | 100 |

*1 Not evaluated

Experimental Example 2

This experiment is intended to illustrate several dosage distribution referring to irradiating electron rays in the film of this invention and to explain the importance of selecting the dosage distribution (depth of irradiation and size of crosslinking degree) to the film.

The dosage distribution is obtained by irradiating many layers of an EVA film (having a vinyl acetate content of 13.5%) having a thickness of 10μ under a condition of irradiating with an apparatus of which dosage distribution is intended to be examined and then measuring with boiling xylene the residual gel fraction of the film as the size of crosslinking degree.

The construction of the cylindrical parison proposed to the experiment is sequentially from the exterior side EVA (having a vinyl acetate content of 13.5% by weight)/PVDCX (a vinylidene chloride-vinyl chloride copolymer resin having a comonomer component derived from the vinyl chloride monomer in the resin of 17% by weight)/EvA (having a vinyl acetate of 13.5% by weight)/a sealing resin layers, which layers had a thickness of 275μ/65μ/225μ/165μ. The aforementioned sealing resin is a mixed resin of an ethylene-α-olefin copolymer resin having a crystalline melting point of 120° C.: ethylene-α-olefin copolymer elastomer: EVA (having a vinyl acetate content of 15% by weight)=8:1:1.

Films are prepared in the same manner as in Experimental Example 1. The relations between the irradiation apparatus and the exposed samples are listed in Table 1.

The dosage distribution in the direction of depth using the modified non-scanning type electron beam irradiation apparatus which was practically used in this experiment was illustrated by a solid line based on the dosage at the surface as 100% in FIG. 1. The dosage distribution using the conventional scanning type electron beam irradiation apparatus by applying a high acceleration voltage of 500 kV was illustrated by a broken line 1. The dosage distribution by applying an extremely low acceleration voltage of 250 kV was illustrated by a broken line 2. The dosage distributions of the exposed samples (Nos. 117–122 and 152) were illustrated as ⓐ to ⓕ and ⓜ in FIG. 2.

For the respective samples, evaluation was carried out by the methods described herein referring to film forming ability by drawing, yellowing of PVDC, oxygen gas barrier property after rough treatment under severe conditions, the barrier property after flexing the film with twisting, heat resistance of the film and gel fraction. The results are listed in Table 2. As for the gel fraction, measurements were carried out for the whole layers of a parison from which the crosslinked polyolefin type resin layer (II) in the exterior surface side of the parison had been peeled, the exterior layer of said layer (II) and the exterior layer in the PVDC layer side of said layer (II). The gel fraction gradient [y/x] was calculated from the partial gel fraction [x] at the exterior surface layer and the partial gel fraction [y] at the surface layer in the PVDC layer side and listed in the table.

The samples illustrated by Nos. 117, 152, 118 to 120 (corresponding to the dosage distributions ⓐ, ⓜ, ⓑ, ⓒ and ⓓ in FIG. 2, respectively) in Table 2 are arranged so that the effect of the change of the dosages of electron rays having a constant penetrating level in the direction of depth can be noted. Sample Nos. 118, 121 and 122 (corresponding to the dosage distribution ⓑ, ⓔ and ⓕ, respectively) are intended to explain the effect of the irradiation of electron rays having different penetrating levels in the direction of depth.

First of all, the effect of penetrating levels of electron rays in the direction of depth is explained. The sample having the dosage distribution ⓑ, film forming ability by drawing and the heat resistance of which are improved by crosslinking and barrier property of which is also retained, is thus preferred. This is probably due to that although the electron rays penetrates with sufficiently crosslinking the crosslinking polyolefin type resin layer (II) into the bonding layer between the layer (II) and the PVDC layer to cause denaturation so as to increase adhesion, it gradually attenuates and penetrates only central position of the PVDC layer, which is irradiated with only a small dosage on the PVDC layer and cause no deterioration. On the other hand, the sample having the dosage distribution ⓕ (No. 122), although it has a crosslinking effect, is drastically deteriorated in the PVDC layer (in retention rate of oxygen barrier property after flexing of film and color tone of PVDC) and thus can not be used practically. The reason is that the gel fraction gradient is 0.63, that is, electron rays penetrates the depth and the PVDC layer is also irradiated with a high dosage of electron rays to cause deterioration. The sample having the dosage distribution ⓔ (No. 121) exhibits a very interesting phenomenon that electron rays does not penetrate into the joint portion between the PVDC layer and the exterior surface layer, which part is not denaturated by electron rays and adhesive strength is not increased. Also uncrosslinked part in the exterior surface layer remains in the neighbourhood of the PVDC layer, which probably makes the film too weak to endure external force.

Next, dosages are explained with reference to electron rays having the same penetrating level in a direction of depth. From the results obtained from the samples of Nos. 117, 152, 118 to 120 listed in Table 2. The dosage range suitable for the film of this invention has a lower limit illustrated by dosage distribution ⓒ (No. 119), in which the gel fraction is 20% by weight in the whole crosslinking polyolefin type resin layer and 25% by weight in the exterior surface layer. If the dosage is less than the lower limit described above, the gel fraction is insufficient as illustrated by the dosage distribution ⓓ (No. 120), so that properties including film forming ability by drawing, heat resistance and resistance to rough treatment under severe conditions are not improved. The upper limit is illustrated by the dosage distribution ⓜ (No. 152), in which the gel fraction is 60% by weight in the whole crosslinking polyolefin type resin layer and 70% by weight in the exterior surface layer. If the dosage is larger than the upper limit, the gel fraction is slightly excessive as illustrated by the dosage distribution ⓐ (No. 117), so that film forming ability by drawing is less preferred.

From the above explanation, it can be said that the range of dosage distribution suitable for the film of this invention is illustrated by ⓜ, ⓑ and ⓒ (sample Nos. 152, 118 and 119, respectively) in FIG. 2. If it is expressed by the penetrating level of electron rays, the gel fraction gradient of the crosslinking polyolefin type resin layer (II) is 0.6 or less and the joint portion between the layer (II) and the PVDC layer (I) is a joint portion which has been crosslinked or almost crosslinked with electron rays. If it is expressed by dosage, the gel fraction of the whole layer (II) is in the range of 20–65% by weight and the gel fraction at the exterior surface layer [x] is in the range of 25–70% by weight.

The range of the gel fraction gradient will be explained again in Experimental Example 5 with reference to the aforementioned layer (II) comprising two layers.

TABLE 1

| Electron beam irradiation apparatus used | Condition | | Irradiation pattern (Marks in FIG. 2) |
|---|---|---|---|
| | Acceleration voltage (KV) | Dosage (Mrad) | |
| Electrocurtain ® (non-scanning type, Titanium foil modified) manufactured by ENERGY SCIENCE INC. | 200 | 13 | ⓐ |
| | | 12.5 | ⓜ |
| | | 10 | ⓑ |
| | | 5 | ⓒ |
| | | 3 | ⓓ |
| | 175 | 12.5 | ⓔ |
| 500 KV Scanning type, manufactured by NISSIN-HIGH VOLTAGE Co. LTD. | 250*2 | 9 | ⓕ |

*1 Dosage at the surface part of the cylindrical parison
*2 If it will be further lowered, output will be too decreased to use it industrially. In addition, the dosage distribution is too short against the depth to apply for this invention.

TABLE 2

| Sample No. | Dosage distribution (Marks in FIG. 2) | Gel fraction of crosslinking polyolefin type resin layer (% by weight) | | Surface layer in the layer [I] side [y] | Gel fraction gradient [y/x] | Film forming ability of drawing | Color tone of PVDC (b value) | Retention rate of oxygen gas barrier property after rough treatment under severe condition | Retention rate of oxygen gas barrier property after flexing of film with twisting | Heat resistance of film |
|---|---|---|---|---|---|---|---|---|---|---|
| | | Whole layer | Exterior surface layer [x] | | | | | | | |
| 117 | ⓐ | 62 | 73 | 31 | 0.42 | △ | ⊚ | ⊚ | ⊚ | ⊚ |
| 152 | ⓜ | 60 | 70 | 28 | 0.40 | ○ | ⊚ | ⊚ | ⊚ | ⊚ |
| 118 | ⓑ | 50 | 61 | 20 | 0.33 | ⊚ | ⊚ | ⊚ | ⊚ | ⊚ |
| 119 | ⓒ | 20 | 25 | 5 | 0.20 | ○ | ⊚ | ⊚ | ⊚ | ○ |
| 120 | ⓓ | 5 | 11 | 1.0 | 0.09 | △ | ⊚ | △ | ⊚ | X |
| 121 | ⓔ | 44 | 70 | 0.4 | <0.01 | ○ | ⊚ | X*1 | ⊚ | ⊚ |
| 122 | ⓕ | 47 | 56 | 35 | 0.63 | ⊚ | X | X | X | ⊚ |

Experimental Example 3

This experiment is intended to explain the significance of the selection of the kind of PVDC in this invention.

This experiment was carried out in the same manner as in Experimental Example 2 except that the composition of PVDC used as the core layer of the sample No. 118 was changed as follows. The PVDC's used were a vinylidene chloride-vinyl chloride copolymer resin and a vinylidene chloride-methyl acrylate copolymer resin. In the vinylidene chloride-vinyl chloride copolymer resin, the content of the comonomer component derived from the vinyl chloride monomer in the resin was varied in 8 levels of 4, 6, 8, 10, 17, 25, 28 and 30% by weight, and in the vinylidene chloride-methyl acrylate copolymer resin, the content of the comonomer component derived from the methyl acrylate monomer in the resin was varied in 6 levels of 1, 3, 10, 15, 18 and 20% by weight. The films thus prepared were evaluated by the evaluation methods described herein with reference to the color tone (b value) of PVDC and oxygen barrier property after flexing of the film with twisting. The results are listed in Table 3.

According to the results shown in Table 3, in the irradiation of electron rays having the dosage distribution ⓑ (FIG. 2), as the PVDC in order to avoid deterioration or yellowing which will be caused at the core layer there are preferably used a vinylidene chloride-vinyl chloride copolymer resin, in which the content of the comonomer component derived from the vinyl chloride monomer in the resin is in the range of 10–25% by weight, and a vinylidene chloride-methyl acrylate copolymer resin, in which the content of the comonomer component derived from the methyl acrylate monomer in the resin is in the range of 3–15% by weight.

As explained above, it is very significant to select suitably the PVDC used as the core layer. In order to exhibit the effect of improving the film forming ability by drawing and the effect of improving the film properties to the maximum, it is necessary to irradiate the polyolefin type resin layer as the surface layer to the direction of its depth with electron rays in a sufficient amount. However, in its case the core layer is inevitably irradiated with electron rays. The presence of PVDC which is relatively stable to electron rays made possible to directly irradiate the surface of a coextruded layer which has been considered impossible to complete direct irradiation.

TABLE 3

| Sample No. | PVDC used Comonomer species | Ratio of VDC: comonomer | Evaluation Result Oxygen barrier property after flexing film | color tone of PVDC |
|---|---|---|---|---|
| 123 | Vinyl chloride | 96:4 | X | X |
| 124 | | 94:6 | X | Δ |
| 125 | | 92:8 | Δ | O |
| 126 | | 90:10 | ⊙ | ⊙ |
| 118 | | 83:17 | ⊙ | ⊙ |
| 127 | | 75:25 | O | ⊙ |
| 128 | | 72:28 | Δ | ⊙ |
| 129 | | 70:30 | X | ⊙ |
| 130 | Methyl acrylate | 99:1 | X | Δ |
| 131 | | 97:3 | ⊙ | ⊙ |
| 132 | | 90:10 | ⊙ | ⊙ |
| 133 | | 85:15 | O | ⊙ |
| 134 | | 82:18 | Δ | ⊙ |
| 135 | | 80:20 | X | ⊙ |

Experimental Example 4

This experiment is intended to explain the construction method of the crosslinking resin layer which is one of the important points for accomplishing the film of this invention, that is, the effect of the processes for providing a crosslinking polyolefin type resin layer on the surface of a laminated film comprising a PVDC layer as the core layer on the properties of the laminated film obtained.

As the methods for constructing the crosslinking layer, there were used the following well-known methods;

a method according to FIG. 1 in Japanese Patent Application Publication No. 43024/83, a method according to Japanese Patent Application Kokai (Laid-Open) No. 143086/76, page 4, a method according to FIGS. 6 and 7 of U.S. Pat. No. 3,821,182, and a method according to Japanese Patent Application Kokaid (Laid-Open) No. 82752/83, pages 4–5, which methods were repeated as precisely as possible (sample Nos. 136, 137, 138 and 139, respectively).

As the electron beam irradiation apparatus, there was used a 500 kv scanning type irradiation apparatus manufactured by NISSIN-HIGH VOLTAGE CO. LTD. The dosage distributions applied to the films were those illustrated in Tables 3-A and 3-B as ⓖ, ⓗ, ⓘ and ⓙ.

For comparison, a laminated film according to Japanese Patent Application Publication No. 1295/86 was prepared as a representative of uncrosslinked (unirradiated) articles and listed in Table 4 as sample No. 140.

The structural features of the laminated films prepared above are listed in Table 4.

These films (sample Nos. 136 to 140) and the film of this invention (sample No. 118) were evaluated by the methods described herein with reference to film forming ability by drawing, reject rate of sealing, color tone (b value) of PVDC, oil resistance on exterior surface, resistance to PLY (interfacial) separation and oxygen gas barrier property after flexing of film external with twisting. The results are listed in Table 5.

According to the results shown in Table 5, effect of improving film forming ability by drawing can be exhibited by using the laminate comprising a cross-linking resin layer. But if electron rays for cross-linking irradiates the PVDC layer largely, the PVDC layer is too extensively deteriorated to use it practically even if a PVDC having a selected content of the comonomer is used.

On the other hand, in the films prepared by laminating another layer on the crosslinked layer (sample Nos. 136 and 139), resistance to PLY (interfacial) separation cannot be guaranteed.

Therefore, it can be said that the construction method of this invention (sample No. 118), in which the whole layers having a sealing layer in the interior side are laminated by a co-extrusion method, and the surface layer of the laminate are moderately crosslinked, is an excellent method for exhibiting satisfactorily properties of respective layers.

TABLE 4

| Sample No. | Layer construction of cylindrical film Exterior ⟵⟶ Interior layer | Characteristics of the process for constructing a crosslinked layer | Dosage distribution (Marks in FIG. 3) |
|---|---|---|---|
| 136 | Irradiation EVA(Vac. 10%)/PVDC*1/EVA(Vac. 10%) (15 μ/10 μ/35 μ) | Process according to Jap. Pat. Appln Publn. No. 43024/83, FIG. 1; precedingly extruded inner EVA layer was irradiated with electron rays and cross- | ⓖ |

TABLE 4-continued

| Sample No. | Layer construction of cylindrical film Exterior ⟵⟶ Interior layer | Characteristics of the process for constructing a crosslinked layer | Dosage distribution (Marks in FIG. 3) |
|---|---|---|---|
| | | linked, and PVDC and EVA layers were laminated by melt-extruded coating method sequentially thereon. | |
| 137 | Irradiation<br>EVA(Vac. 10%)/PVDC*¹/EVA(Vac. 10%)<br>(15 μ/10 μ/35 μ) | Process according to Japanese Patent Application Laid-Open No. 143086/76, page 4; after repetition of the above process and film formation, electron rays were irradiated over all layers of the film and crosslinking was conducted. | (h) |
| 138 | Irradiation<br>LDPE (density 0.92)/PVDC*¹/LDPE(density 0.92)<br>(15 μ/10 μ/35 μ) | Process according to U.S. Pat. No. 3,821,182, FIGS. 6 and 7; after intra-die laminated extrusion of LDPE/PVDC/LDPE, whole layers of the cylindrical parison were irradiated with electron rays and crosslinked. | (i) |
| 139 | Irratiation<br>Blend composition A*²/EVA (Vac. 15%)/PVDC*¹/EVA (Vac. 15%)/Blend composition B*²<br>(13 μ/2 μ/10 μ/2 μ/33 μ) | Process according to Japanese Patent Application Laid-Open No. 82752/83, page 4, right upper column, line 3 - page 5, line 8; interior layer blend composition B having been precedingly extruded was irradiated with electron rays and crosslinked, and co-extruded EVA/PVDC/EVA and blend composition A were sequentially laminated thereon by melt-extruded coating method. | (j) |
| 140 | L-LDPE*³/EVA (Vac. 20%)/PVDC*¹/EVA (Vac. 15%)/L-LPDE*³<br>(7 μ/1 μ/8 μ/36 μ/8 μ) | Process according to Japanese Pat. Appln. Publn. No. 1295/82, page 4; no irradiation. | ⊖ |

*¹Vinylidend chloride-vinyl chloride copolymer resin, in which a comonomer component derived from the vinyl chloride monomer in the resin is in an amount of 17% by weight.
*²(Resin mentioned in *³): EVA (having vinyl acetate of 10% by weight = 2:8.)
*³Linear low density polyethylene having a crystalling melting point of 120° C. and a density of 0.920.

TABLE 5

| Sample No. | Dosage distribution (Marks in FIGS. 2 or 3) | Film forming property by drawing | Reject rate of sealing | Color tone (b value) | Oil resistance on exterior surface | PLY (interfacial) separability | Oxygen barrier property after flexing of film |
|---|---|---|---|---|---|---|---|
| 118 | (b) | ⊙ | ⊙ | ⊙ | ⊙ | ⊙ | ⊙ |
| 136 | (g) | ⊙ | △ | ⊙ | X | X | ⊙ |
| 137 | (h) | ⊙ | X | X | O | ⊙ | X |
| 138 | (i) | O | X | X | ⊙ | O | X |
| 139 | (j) | O | △ | ⊙ | X | ⊙ | ⊙ |
| 140 | Unirradiated | X | X | ⊙ | O | O | ⊙ |

Experimental Example 5

This experiment is intended to explain specifically the creative content of the method for producing a crosslinked surface layer which is advantageous for improving the film of this invention having a high crosslinking degree (gel fraction) without damaging the so-called film forming ability by drawing, and the effect thereof.

Experiment was carried out in the same manner as in Experimental Example 2 to obtain a film of sample No. 117 (dosage distribution ⓐ). Experiment was also carried out in the same manner as above except that in the layer construction, the outermost part having a thickness of 170 μ in the interior side of the EVA layer (vinyl acetate content, 13.5% by weight) having a thickness of 275 μ at the exterior layer is replaced with an EVA resin layer having a vinyl acetate content of 10% by weight, and the residual part having a thickness of 105 is replaced with an EVA resin layer having a vinyl acetate content of 15% by weight to obtain the sample No. 141. The sample is formed in the same manner as in Experimental Example 1 by the use of an apparatus illustrated in FIG. 5, and specifically film was formed by the use of five extruders including another extruder in addition to four extruders 1-3' illustrated in FIG. 5. The sample No. 141 was evaluated in the same manner as in Experimental Example 2 according to the methods described herein with reference to film forming ability by drawing, yellowing of the PVDC layer, oxygen gas barrier property after rough treatment under severe conditions, oxygen gas barrier property after flexing of film with twisting, heat resistance of film and the gel fraction of the polyolefin type resin layer. The results are listed together with those of the sample No. 117 in Table 14 for comparison. The gel fraction in Table 14 was measured for that [x] at the exterior surface layer and that [y] at the surface layer in the layer (I) and listed together with the gel fraction gradient [y/x].

In order to find the practical gel fraction (crosslinking degree) to the direction of the depth in the surface layer, a film having a thickness of 10 μ was layered to obtain a laminate as a model sample. The sample was subjected to irradiation with electron rays, and then evaluation was carried out in the same way as above. The results were illustrated as the distributions of gel fraction ⓚ and ⓛ in FIG. 4. The difference of the distributions of the gel fraction ⓚ and ⓛ under the same dosage depends on the difference of the crosslinking efficiencies of resins on irradiation. In other words, in the sample No. 117 the surface layer is an EVA (having a vinyl acetate content of 13.5% by weight) layer and the distribution traces the curve of ⓚ. In the sample No. 141, the EVA having a vinyl acetate content of 10% by weight has a low crosslinking efficiency, so that the gel fraction drops down relatively. On the other hand, the intermediate surface layer comprising EVA having a vinyl acetate content of 15% by weight has a higher crosslinking efficiency, so that the distribution shows a high value. Thus, the sample No. 141 forms the distribution curve ⓛ having a cleavage.

If such a phenomenon is examined from an aspect of the change of film forming ability by drawing, the failure of film forming ability by drawing in the sample No. 117 will be improved to the maximum by the sample No. 141, as shown in Table 14. A part which has a partial gel fraction of 73% by weight and is hardly drawn is present in surface layer of the parison of the sample No. 117, while in the sample No. 141 having the distribution ⓛ the excessively crosslinked part which is hardly drawn is removed.

In conventional art, if the failure of film forming ability by drawing illustrated by the distribution ⓚ dosage was lowered by controlling the irradiation condition. But the whole distribution of dosage was also lowered, and consequently the gel fraction was also lowered. On the other hand, the creativeness of this invention consists in that if the layer corresponding to the excessive gel fraction is replaced with a resin having a lower crosslinking efficiency, only the excessive crosslinking part can be removed without levelling down the whole gel reaction.

The difference of the crosslinking effect to the same dosage depends oh the relative values of the resins to be used. That is, when an EVA having a vinyl acetate content of 13–20% by weight of which PLY (interfacial) adhesive strength is extensively increased by irradiation of electron rays are used, a resin having a lower crosslinking efficiency such as specifically an EVA having a vinyl acetate content of 10–5% by weight, a low density or very-low density linear polyethylene or linear low-density polyethylene, a mixed resin of the two or a sealing resin comprising three components according to this invention is used. The group of resins having low crosslinking efficiency exhibits very excellent properties (e.g. thermostability, oil resistance, rub resistance, toughness and the like) upon crosslinking compared with those exhibited by the crosslinking of the EVA having a vinyl acetate content of 13–20% by weight.

Based on the technical aspects the crosslinking resin layer of this invention comprises two layers having high and low crosslinking efficiency, respectively, of which the one having low crosslinking efficiency is used as the outermost surface layer.

Referring to the gel fraction gradient [y/x] of the sample Nos. 141 and 117, it shows a value of 0.42 in the sample No. 117 and 0.57 in the sample No. 141, because the crosslinking polyolefin type resin layer (II) comprises two layers having different crosslinking efficiency from each other. Thus, if two layers having crosslinking efficiency are used for the layer (II), the gel fraction gradient does not exceed a value of 0.63 at the dosage distribution ⓕ (sample No. 122) shown in Table 2 in Experimental Example 2. Therefore, the film of this invention can be characterized in that the gel fraction gradient of the layer (II) is 0.6 or less. The partial gel fraction [y] of the surface layer in the PVDC layer side in the aforementioned layer (II) is 36% by weight even in the case of the sample No. 141 in which a resin having a high crosslinking efficiency is used for the intermediate surface layer, at most 40% by weight or less. The sample No. 122 has a partial gel fraction [y] of 35% by weight, but the gel fraction gradient is 0.6 or more, so that electron rays penetrates into the PVDC layer, which is thus deteriorated.

TABLE 14

| Sample No. | Distribution of gel fraction (Marks in FIG. 4) | Gel fraction in cross-linking polyolefin type resin layer | | | Gel fraction gradient [y/x] | Film forming property of drawing | Color tone of PVDC (b value) | Retention rate of oxygen gas barrier property after rough treatment under severe condition | Retention rate or oxygen barrier property after flexing of film with twisting | Heat resistance of film |
|---|---|---|---|---|---|---|---|---|---|---|
| | | whole layers | exterior layer [x] | surface layer in layer (I) side | | | | | | |
| 141 | ① | 59 | 63 | 36 | 0.57 | ◎ | ◎ | ◎ | ◎ | ◎ |
| 117 | ⓚ | 62 | 73 | 31 | 0.42 | △ | ◎ | ◎ | ◎ | ◎ |

Experimental Example 6

This experiment is intended to distinguish the adhesive strength of an EVA, an ethylene-α-olefin copolymer resin, three layered of which vinyl acetate contents are different from each other and a PVDC, by the irradiating electron rays or not.

By means of a conventional three layered well-known co-extruder equipment, a cylindrical parison having a three layer structure of EVA/PVDC/EVA could be formed by extrusion, an EVA having a vinyl acetate content of 15% by weight and a PVDC were fixedly supplied into an extruder for a interior layer and an extruder for a core layer, respectively. In an extruder for an exterior layer were supplied sequentially an ethylene-o-olefin copolymer resin $A_5$ (very-low density polyethylene: density, 0.900; crystalline melting point, 115° C.; manufactured by Sumitomo Chemical Co., Ltd.) and EVA's having a vinyl acetate content of 5, 10, 13, 15, 20 and 25% by weight were sequentially supplied. A co-extruded cylindrical laminated parison having a flat width of 150 mm and a thickness of 30 μ/30 μ/30 μ was extruded and cooled rapidly to be taken out. To this parison was used a ELECTRO CURTAIN® manufactured by ENERGY SCIENCE INC., described in Table 1, and irradiation with electron rays was conducted at a acceleration voltage of 200 kV and a dosage of 5 Mrad (pattern ⓒ in Table 1). It was left standing for three days at room temperature together with a parison without irradiation for comparison. After the parison was cut out into a flat parison, the adhesive strength of the EVA layer in the exterior layer side and the core layer was measured by a constant speed tensile testing machine. The measurement condition was the sample width of 15 mm, the tensile angle of 180° and 500 mm/min of tensile speed.

FIG. 6 illustrates the aforementioned adhesive strengths (g/15 mm width) classified by irradiating electron rays or not, to the vinyl acetate content of the resin used. The axis of abscissa in the right side is crystalline melting point, and the value of the used resin and catalogue values of used resins and two others (measured by the DSC method) are illustrated. One of these two resins are a low density polyethylene resin $A_0$ (density, 0.920; crystalline melting point, 108° C.), and the other is an ethylene-α-olefin copolymer resin $A_3$ (linear low density polyethylene: density, 0.923; crystalline melting point, 122° C.; trade name, Dowlex; manufactured by DOW CHEMICAL CO.). The solid line in the graph illustrates the adhesive strength of the PVDC layer and the adjacent layer in the cylindrical surface side. The empty marks mean the case without irradiation of electron rays. The black-painted marks mean the case with irradiation of electron rays. Empty circles ○ illustrate the values of EVA, and empty squares □ illustrate the values of the ethylene-α-olefin copolymer resin. Empty triangles △ and chain line illustrate the crystalline melting points of respective resins.

The difference of the empty circles and black-painted circles ⊙ in FIG. 6 represents the increase of the adhesive strength with the PVDC layer at folding part by crosslinking. Generally, crosslinking efficiency under the constant dosage is considered to be in proportion to the vinyl acetate content. Accordingly, in the relationship in FIG. 6, the phenomenon of increasing the adhesive strength in the region of the vinyl acetate content of 13% by weight or more may be anticipated. However, it was extraordinarily found that in the region of lower vinyl acetate content side of less than 13% by weight the adhesive strength was remarkably increased, which corresponded to the value exhibited by the uncrosslinked EVA having a vinyl acetate content of about 13–20% by weight. Moreover, also in an ethylene-α-olefin copolymer resin (having a vinyl acetate content of 0% by weight) which will not usually adhere substantially to PVDC adhesive strength as high as in the EVA having a vinyl acetate content of about 13% by weight could be obtained. (See the symbol ▨ in FIG. 6)

Experimental Example 7

This experiment is intended to explain the effect of dosage of electron rays on the adhesive strength at the bonding part of the PVDC layer and the adjacent layer thereof when a crosslinking layer is provided without deterioration of the PVDC layer by the irradiation of electron rays.

The methods for constructing the crosslinking layer without deteriorating the PVDC layer include methods ① irradiating after co-extrusion with a modified non-scanning type electron beam irradiating apparatus, as shown in Experimental Example 1 of this invention, and, ② extra-die laminating by melt-extruded coating method after irradiating electron rays in accordance with the method of FIG. 1 of U.S. Pat. No. 3,741,253.

In this experiment, as the method ①, a parison comprising three layers was extruded by the three extruders 1-3 in FIG. 5, drawn out at a speed of 3 m/min to make a cylindrical parison having a flat width of 130 mm. The parison has a construction sequentially from the exterior side of EVA (having a vinyl acetate content of 10% by weight)/PVDC (a vinylidene chloride-vinyl chloride copolymer resin having a comonomer component derived from the vinyl chloride monomer in the resin in an amount of 17% by weight)/EVA (having a vinyl acetate content of 15% by weight) with a thickness of 275 μ/65 μ/390 μ. The parison was irradiated with electron rays by an electron beam irradiating apparatus 8. The electron beam irradiating apparatus and dosing condition used are listed in Table 13. The crosslinked parison as heated to a temperature of 80° C. in a heating bath 17, then subjected to inflation bi-axial orientation to three times machine direction and four transverse direction wide, and the film having a flat width of 520 mm and an average thickness of 61μ was formed in a length of 200 m and rolled round a bobbin. For comparison, a film was also prepared without irradiation. The sample Nos. 142 and 143 listed in Table 13 showed somewhat difficulty for the start-up of drawing.

As the method ②, a cylindrical EVA (having a thickness of 275 μ and a vinyl acetate content of 10% by weight) was first prepared, and the parison was irradiated with an electron beam irradiating apparatus and dosing condition listed in Table 13. Immediately after irradiation, a PVDC layer and an EVA layer were laminated with the parison in accordance with the method illustrated in FIG. 1 of Japanese Patent Application Publication No. 43024/83 to make a cylindrical parison having the layer construction from the exterior side of EVA (having a vinyl acetate content of 15% by weight)/PVDC (a vinylidene chloride vinyl chloride copolymer resin, in which the content of the comonomer component derived from the vinyl chloride monomer in the resin is 17% by weight)/EVA (having a vinyl acetate content of 10% by weight) with a thickness of 390 μ/65 μ/275 μ and a flat width of 130 mm. Then, the cylindrical parison was subjected to inflation bi-axial orientation treatment in the same manner as in ① to make a film. A further film was prepared for comparison without irradiation. The sample Nos. 147 and 148 listed in Table 13 showed somewhat difficulty for the start-up of drawing.

Each sample was left standing while rolled round the bobbin for three days at room temperature, then the adhesive strength between the crosslinked EVA layer and the PVDC layer was measured over all width of the cylindrical film with a constant speed tensile testing machine. The measurement was carried out under the conditions of a sample width of 20 mm, a tensile angle of 180° and a tensile speed of 500 mm/min.

FIG. 8 illustrates the adhesive strength measured above (g/20 mm width) plotted to the dosage of electron rays separately for the irradiation methods of ① and ②, represent the case in which empty circles ○ of this invention and black-painted circles ● represent the case of conventional well-known method.

TABLE 13

| Sample No. | Film forming method | Electron beam irradiating apparatus used | Condition Accelaration voltage (KV) | Dosage (Mrad) |
|---|---|---|---|---|
| 142 | ① | No irradiation of electron beam | | |
| 143 | | ELECTRO-CURTAIN ® | 200 | 3 |
| 144 | | (Titanium foil | | 5 |
| 145 | | modified non- | | 8 |
| 146 | | scanning type), manufactured by ENERGY SCIENCE INC. | | 10 |
| 147 | ② | No irradiation of electron beam | | |
| 148 | | Scanning type | 500 | 3 |
| 149 | | electron beam | | 5 |
| 150 | | irradiating | | 8 |
| 151 | | apparatus, manufactured by | | 10 |

TABLE 13-continued

| Sample No. | Film forming method | Electron beam irradiating apparatus used | Condition Accelaration voltage (KV) | Dosage (Mrad) |
|---|---|---|---|---|
| | | NISSHIN HIGH-VOLTAGE CO. LTD. | | |

Example, Comparative Example 1

Following experiment was carried out to explain the appropriate constructions of layer and thickness for obtaining the film of this invention. That is, the apparatus (and the method) illustrated in FIG. 5 as used, and twenty-eight kinds of films (sample Nos. 1–28) having the layer constructions and the gel tractions which are shown in the items (see Tables 6-A and 6-B) "layer construction of film" and "gel fraction of crosslinked polyolefin type resin layer", respectively, were formed.

Films were prepared in the same manner as in Experimental Example 1 in FIG. 5. First of all, a parison was formed with four extruders 1–3' for the sample Nos. 1–23, 14–16, 22 and 28; five extruders for the sample No. 13; three extruders 1–3 for the sample Nos. 17–21, 23–27; and four layer extrusion was carried out for the sample Nos. 19 and 23, and five layer extrusion was carried out for all other samples. The modified non-scanning type electron beam irradiating apparatus which as used in Experimental Example 1 was used as the electron beam irradiating apparatus, in which acceleration voltage was controlled based on the preliminarily calibrated relationship of acceleration voltage and dosage distribution (depth) regarding the thickness of the polyolefin type resin layer (II) of each parison so that the dosage will be zero at around the center of the PVDC layer. For example, in the sample Nos. 1 and 3 having the same total parison thickness of 720μ, the thickness of the polyolefin type resin layer (II) is 120 and 300μ, respectively, and thus acceleration voltage was adjusted to 150 KV and 200 kV, respectively. After crosslinking, all samples were subjected to inflation biaxial orientation treatment to ca. 3 times machine direction and ca. 4 time transverse direction to form a film having a prescribed layer thickness.

These films were left standing while rolled round the bobbin for 7 days at room temperature, and then evaluation was carried out by the methods mentioned herein referring to film forming ability by drawing, heat shrinkability, retention factor of oxygen barrier property after rough treatment under severe condition, heat resistance and oil resistance (on exterior surface and dint), falling bag resistance at low temperature and heat resistance of film. The results are listed in the columns of results in Tables 6-A and 6-B.

The results in Tables 6-A and 6-B indicate the followings. That is, the sample Nos. 1–5 relate to an appropriate thickness of "crosslinking polyolefin type resin" at the surface layer and the sample Nos. 6–9 relate to an appropriate crosslinking degree (gel fraction) of the resin.

According to the results listed, the crosslinking polyolefin type resin layer requires a thickness in a proportion of 25% or more to the total thickness (sample No. 2) and a gel fraction in a proportion of 20% or more (sample No. 7). However, if the thickness is 40μ or more (sample No. 5), the proportion to the total thickness exceeds 65%. The crosslinking polyolefin type resin layer affects the other layer components, and thus soft feeling was decreased because of the decrease of falling bag resistance at low temperature. Further, if the average gel fraction degree is 65% or more (sample No. 9), film forming ability by drawing is deteriorated.

The sample Nos. 3, 17 to 19 and 24 to 28 relate to the resin component of the crosslinking polyolefin type resin layer. By observing the results obtained from these samples, it is understood that a polyolefin type resin, an ethylene-α-olefin copolymer resin and an EVA can be used as an component of the crosslinking polyolefin type resin layer. In the case of the ethylene-α-olefin copolymer resin, all of the resins having a density of 0.894 and a crystalline melting point of 113° C. (sample No. 25) and having a density of 0.923 and a crystalline melting point of 122° C. (sample No. 28) exhibit good physical properties, and thus it appears that the so-called very-low density polyethylene, linear low density polyethylene or low density polyethylene can be used. To be noted herein is the performance of the sample No. 19. As apparent from the sample No. 23, the PVDC and the ethylene-α-olefin copolymer resin are less adhesive to each other, and thus the film performance is decreased on using them in an adjacent position to each other in a laminated film. On the other hand, in the sample No. 19, adhesive strength is improved by the irradiation of this invention as described in Experimental Example 6.

The vinylidene chloride type resin layer is generally required for maintaining a level of gas barrier property in a thickness of at least 4μ. However, the thickness becomes 15μ or more (sample No. 11), it becomes difficult to maintain falling bag resistance at low temperature.

The sample Nos. 3, 10, 17 and 20-22 relates to an appropriate thickness (upper limit) of the sealing resin layer. It is generally considered that the sealing resin layer requires a thickness of at least 3μ to serve as an oil resistant sealing layer. However, the upper limit is at most 40% (sample No. 21) of the total thickness. If it reaches 50% (sample No. 22), drawing ability is deteriorated and heat shrinkability cannot be increased.

As for the resin components of the sealing resin layer, explanation is conducted in detail in Example, Comparative Example 2. By observing the sample Nos. 3, 17 and 24 to 27, it is understood that the ethylene-α-olefin copolymer resin or the mixed resins containing said resin as a main component exhibit good physical property. This kind of film is generally used in a thickness of 40μ (sample No. 15) to 80μ (sample No. 16). If it is thinner than the lower limit, it lacks durability as a package. If it is too thick, film forming ability by drawing is deteriorated and besides it lacks economy.

The sample Nos. 17 to 21, 23 to 27 are advantageously prepared economically by using three extruders. Among them, the sample Nos. 17, 18, 20 and 24 to 27 are considered to be a film having excellent performance and high economy.

As the result for the thickness construction, it is preferred that in the film of this invention in which the layer components are a crosslinking polyolefin type resin layer/a core layer/a adhesive shrinkable resin layer/a sealing resin layer and the total thickness is in the range of 40–80μ, the core layer has a thickness in the range of 4μ or more and less than 15μ, the sealing resin layer has a thickness of 4μ or more but 40% or less of the total thickness, the crosslinking polyolefin type resin layer having a gel fraction of 20–65% has a thickness in a proportion of 25%–65% to the total thickness, and the balance with the adhesive shrinkable resin layer. Films having such a layer construction is excellent in film forming ability by drawing, heat resistance and oil resistance and tough, and readily maintains heat shrinkability.

The sample No. 28 is a film, in which on the outermost layer a resin having a higher crystalline melting point than the sealing resin layer and crosslinking treatment was conducted so as to improve the heat resistance on the outermost layer.

TABLE 6-A

| Sample No. | Layer construction of cylindrical film (thickness μ) Exterior layer ⇌ Interior layer | | | | | Gel fraction of crosslinking polyolefin type resin layer (% by weight) |
|---|---|---|---|---|---|---|
| | Outermost layer of crosslinking type resin layer I | Intermediate surface layer of crosslinking polyolefin type resin layer II | PVDC layer | Adhesive shrinkable resin layer | Sealing resin layer | |
| 1 | EVA1 (6) | EVA2 (4) | ↑ | EVA2 (36) | ↑ | 30 |
| 2 | EVA1 (9) | EVA2 (6) | ↑ | EVA2 (31) | ↑ | 36 |
| 3 | EVA1 (15) | EVA2 (10) | ↑ | EVA2 (21) | Blend composition 1 | 40 |
| 4 | EVA1 (21) | EVA2 (14) | PVDC1 (8) | EVA2 (11) | (6) | 37 |
| 5 | EVA1 (24) | EVA2 (16) | ↓ | EVA2 (6) | ↓ | 35 |
| 6 | ↑ | ↑ | ↓ | ↑ | ↓ | 10 |
| 7 | ↑ | ↑ | ↓ | EVA2 | ↓ | 20 |
| 8 | ↑ | ↑ | ↓ | (21) | ↓ | 60 |
| 9 | EVA1 | EVA2 | ↓ | ↓ | ↓ | 65 |
| 10 | (15) | (10) | ↓ | EVA2 (12) | Blend composition 1 (15) | 38 |
| 11 | ↓ | ↓ | PVDC1 (15) | EVA2 (14) | ↑ | 35 |
| 12 | ↓ | ↓ | PVDC2 (8) | EVA2 (21) | Blend composition 1 | 38 |
| 13 | ↓ | ↓ | PVDC1 (8) | EEA (21) | (6) | 38 |

TABLE 6-A-continued

| Sample | | | | | | |
|---|---|---|---|---|---|---|
| 14 | ↓ | EVA3 (10) | PVDC1 (8) | EVA3 (21) | ↓ | 37 |
| 15 | EVA1 (10) | EVA2 (6) | PVDC1 (4) | EVA2 (16) | Blend composition 1 (4) | 38 |
| 16 | EVA1 (21) | EVA2 (14) | PVDC1 (10) | EVA2 (25) | Blend composition 1 (10) | 33 |

Evaluation result

| Sample No. | Film forming ability by drawing | Heat shrink-ability | Retention rate of oxygen gas barrier property after rough treatment under severe condition | Oil resistance at high temperature Exterior surface | Oil resistance at high temperature dint | Falling bag resistance at low temperature | Heat resistance of film |
|---|---|---|---|---|---|---|---|
| 1 | O | O | x | ⊚ | x | ⊚ | O |
| 2 | O | O | O | ⊚ | O | ⊚ | ⊚ |
| 3 | ⊚ | ⊚ | ⊚ | ⊚ | ⊚ | ⊚ | ⊚ |
| 4 | ⊚ | ⊚ | ⊚ | ⊚ | ⊚ | O | ⊚ |
| 5 | ⊚ | ⊚ | O | ⊚ | O | x | ⊚ |
| 6 | O | O | Δ | x | x | O | Δ |
| 7 | O | O | O | O | O | ⊚ | ⊚ |
| 8 | ⊚ | ⊚ | ⊚ | ⊚ | ⊚ | ⊚ | ⊚ |
| 9 | x | ⊚ | O | ⊚ | ⊚ | O | ⊚ |
| 10 | ⊚ | ⊚ | ⊚ | ⊚ | ⊚ | ⊚ | ⊚ |
| 11 | ⊚ | O | ⊚ | ⊚ | ⊚ | Δ | ⊚ |
| 12 | ⊚ | ⊚ | ⊚ | ⊚ | ⊚ | ⊚ | ⊚ |
| 13 | O | ⊚ | ⊚ | ⊚ | ⊚ | ⊚ | ⊚ |
| 14 | ⊚ | ⊚ | ⊚ | ⊚ | ⊚ | ⊚ | ⊚ |
| 15 | ⊚ | ⊚ | ⊚ | ⊚ | ⊚ | O | ⊚ |
| 16 | O | ⊚ | O | ⊚ | ⊚ | ⊚ | ⊚ |

Note
EVA1: Vinyl acetate content, 10% by weight;
EVA2: Vinyl acetate content, 15% by weight;
EVA3: Vinyl acetate content, 20% by weight;
EEA: Ethylene-methyl acrylate copolymer resin, ethyl acrylate content, 7% by weight;
PVDC1: Vinylidene chloride-vinyl chloride copolymer resin, in which a comonomer component derived from the vinyl chloride monomer in the resin is in an amount of 17% by weight;
PVDC2: Vinylidene chloride-methyl acrylate copolymer resin, in which a comonomer component derived from the methyl acrylate monomer in the resin is in an amount of 10% by weight.
Blend composition 1: Mixture of ethylene-α-olefin copolymer resin (density, 0.920; crystalline melting point, 120° C.), trade name ULTZEX manufactured by MITSUI PETROCHEMICAL INDUSTRIES, LTD. / EVA2/ ethylene-α-olefin copolymer elastomer (density, 0.88; Vicat softening point, <40° C.), trade name TAFMER manufactured by MITSUI POLYCHEMICAL CO. = 80/10/10

TABLE 6-B

| | Layer construction of cylindrical film (thickness μ) Exterior layer ⇌ Interior layer | | | | | Gel fraction of crosslinking polyolefin type resin layer (% by weight) |
|---|---|---|---|---|---|---|
| Sample No. | Outermost layer of crosslinking type resin layer I | Intermediate surface layer of crosslinking polyolefin type resin layer II | PVDC layer | Adhesive shrinkable resin layer | Sealing resin layer | |
| 17 | A4 (10) | EVA2 (15) | ↑ | ↑ | ↑ | 38 |
| 18 | A4 (20) | EVA2 (5) | ↑ | EVA2 (21) | A4 (6) | 37 |
| 19 | A4 (25) | No layer | PVDC1 (8) | ↓ | ↓ | 35 |
| 20 | ↑ | EVA2 (15) | ↓ | EVA2 (12) | A4 (15) | 40 |
| 21 | A4 (10) | EVA2 (13) | ↓ | EVA2 (5) | A4 (24) | 39 |
| 22 | ↓ | EVA2 (7) | ↓ | EVA2 (5) | A6 (30) | 38 |
| 23 | ↓ | EVA2 (18) | ↓ | No layer | A4 (24) | 40 |
| 24 | A5 (10) | ↑ | ↓ | ↑ | A5 (6) | 36 |
| 25 | A6 (10) | ↑ | ↓ | ↑ | A6 (6) | 39 |
| 26 | Blend composition 2 (10) | EVA2 (15) | ↓ | EVA2 (21) | Blend composition 2 (6) | 38 |
| 27 | Blend composition 3 (10) | ↓ | ↓ | ↓ | Blend composition 3 (6) | 40 |

TABLE 6-B-continued

| Sample No. | | | | | | |
|---|---|---|---|---|---|---|
| 28 | A3 (10) | ↓ ↓ | ↓ ↓ | ↓ ↓ | A5 (6) | 39 |

Evaluation result

| Sample No. | Film forming ability by drawing | Heat shrink-ability | Retention rate of oxygen gas barrier property after rough treatment under severe condition | Oil resistance at high temperture — Exterior surface | dint | Falling bag resistance at low temperature | Heat resistance of film |
|---|---|---|---|---|---|---|---|
| 17 | ◎ | ◎ | ◎ | ◎ | ◎ | ◎ | ◎ |
| 18 | ◎ | ◎ | ◎ | ◎ | ◎ | ◎ | ◎ |
| 19 | ◎ | ◎ | O | ◎ | ◎ | ◎ | ◎ |
| 20 | ◎ᵗ | ◎ | ◎ | ◎ | ◎ | ◎ | ◎ |
| 21 | ◎ˢ | O | ◎ | ◎ | ◎ | O | ◎ |
| 22 | x | Δ | ◎ | ◎ | ◎ | Δ | ◎ |
| 23 | Δ | O | x | ◎ | ◎ | x*1 | ◎ |
| 24 | ◎ | ◎ | ◎ | ◎ | ◎ | ◎ | ◎ |
| 25 | ◎ | ◎ | ◎ | ◎ | ◎ | ◎ | ◎ |
| 26 | ◎ | ◎ | ◎ | ◎ | ◎ | ◎ | ◎ |
| 27 | ◎ | ◎ | ◎ | ◎ | ◎ | ◎ | ◎ |
| 28 | ◎ | ◎ | ◎ | ◎ | ◎ | ◎ | ◎ |

Note
A1: Ethylene-α-olefin copolymer resin (density, 0.920; crystalline melting point, 120° C.), trade name ULTZEX manufactured by MITSUI PETROCHEMICAL INDUSTRIES, LTD.
A3: Ethylene-α-olefin copolymer resin (density, 0.923; crystalline melting point, 122° C.), trade name DOWLEX manufactured by DOW CHEMICAL CO.
A4: Ethylene-α-olefin copolymer resin (density, 0.906; crystalline melting point, 118° C.), trade name NUCFLX manufactured by NIPPON UNICAR CO.
A5: Ethylene-α-olefin copolymer resin (density, 0.900; crystalline melting point, 115° C.), trade name EXCELLENT VL manufactured by SUMITOMO CHEMICAL CO., LTD.
A6: Ethylene-α-olefin copolymer resin (density, 0.894; crystalline melting point, 113° C.), trade name NIPOLONL manufactured by TOYO SODA CO., LTD.
Blend composition 1: Mixture of A4/A5 = 50/50;
Blend composition 2: Mixture of A4/A1 = 70/30;
EVA2: Vinyl acetate content, 15% by weight;
PVDC1: Vinylidene chloride-vinyl chloride copolymer resin, in which a comonomer component derived from the vinyl chloride monomer in the resin is in an amount of 17% by weight.
*1In falling bag test, sealing parts in all bag samples were in ply separation between the PVDC layer and the inner layer.

Example, Comparative Example 2

For this invention, experiment was conducted in order to specifically explain the component and composition of the sealing resin layer which is as significant as the crosslinking polyolefin type resin layer.

That is, the basic construction of the film is designed as shown below using a film which was prepared from the sample Nos. 3, 17 and 24 to 28 used in Example, Comparative Example 1, and an apparatus illustrated in FIG. 5 in the same manner as in Example, Comparative Example 1. Samples comprising the resins listed in the item of "resin component of sealing resin layer" in Table 7-B as the component resin at the part of the sealing resin layer (sample Nos. 29 to 51) were used in experiment. The laminated films used in the experiment were 30 kinds in total.

| | |
|---|---|
| Crosslinking polyolefin resin layer (gel fraction, ca. 40%) 25 μ | EVA layer having a vinyl acetate content of 10%, 15 μ |
| PVDC layer (VDC:VC = 87:13) 6 μ | EVA layer having a vinyl acetate content of 15%, 10 |
| EVA layer having a vinyl acetate content of 15%, 23 μ | |
| Sealing resin layer 6 μ | |

As for the 30 kinds of films, evaluation was conducted referring to "reduction of defective rate of sealing" and "reduction of time required for sealing" which are the main objects of this invention, and "transparency after shrinking" according to the methods described herein. The results are listed in "results of evaluation" in tables 7-A and 7-B.

The marks of "synthetic evaluation" in Tables 7-A and 7-B represent the grades using the following criteria from the standpoint of the object (effect) of this invention.

⊚: ⊚ of all three items;
O: including the grade referring to at least one item (other may be in the grade or );
Δ: including the grade Δ referring to at least one item (other may be in any grade);
X: including the grade X referring to at least one item (other must be in any grade)

In Table 7-A, most of the sealing resin layers comprises an ethylene-α-olefin copolymer resin, and in Table 7-B, most of the sealing resin layers comprise mixed resins which contain an ethylene-α-olefin copolymer resin as a main component.

Ethylene-α-olefin copolymer resins including those having a density of 0.89 and a crystalline melting point of 113° C. (sample Nos. 24, 28) and a density of 0.923 and a crystalline melting point of 122° C. (sample No. 38) show excellent physical properties, so that it appears that the so-called very-low density polyethylene, linear low density polyethylene and low density polyethylene can be used.

For the purpose of ready understanding of the mixing ratio of an ethylene-α-olefin copolymer elastomer and the EVA of the mixed resin in which the ethylene-α- olefin copolymer resin is contained as a main component, FIG. 7 is appended. This figure is an analytical diagram of Table 7-A and 7-B, in which the marks of synthetic evaluation are plotted on the positions of the components of the sealing resin of the film. FIG. 7 illustrates by spatial restriction only the parts which can be represented by the three components of the ethylene-α-olefin copolymer resin, the ethylene-α-olefin copolymer elastomer and the ethylene-vinyl acetate copolymer.

According to the results obtained from FIG. 7, the composition of the sealing resin layer for satisfying the aforementioned object of this invention is an ethylen-α-olefin copolymer resin (resin A) having a density of 0.88 to 0.93 and a crystalline melting point of 110°–130° C., a mixed resin which comprises 60% by weight or more of said resin A and 40% by weight or less of an ethylene-α-olefin copolymer elastomer (resin B) or a mixed resin which comprises 40% by weight or more of said resin A, 5–40% by weight of said resin B and 55% by weight or less of an ethylene-vinyl acetate copolymer resin (resin C), in which the total amount being 100%.

To be noted is sample No. 28, in which on the outermost surface is arranged a resin having a crystalline melting point higher than that of the sealing resin layer (the resin at the outermost layer of the crosslinking polyolefin type resin layer: crystalline melting point, 122°; the resin at the sealing resin layer: crystalline melting point, 115° C.), and the resin having a higher crystalline melting point is crosslinked to improve heat resistance. Accordingly, the sealing performance is remarkably improved.

TABLE 7-A

| Sample No. | Resin composition of sealing resin layer Resin used (Blending ratio, %) | | | Reject rate of sealing | Reduction required for sealing | Transparency after shrinking | Synthetic evaluation |
|---|---|---|---|---|---|---|---|
| 3  | $A_1$ (80) | $B_1$ (10) | $C_2$ (10) | ◉ | ◉ | ◉ | ◉ |
| 17 | $A_4$ (100) | — | — | ◉ | ◉ | ◉ | ◉ |
| 24 | $A_5$ (100) | — | — | ◉ | ◉ | ◉ | ◉ |
| 25 | $A_6$ (100) | — | — | ◉ | ◉ | ◉ | ◉ |
| 26 | $A_2$ (50), $A_5$ (50) | — | — | ◉ | ◉ | ○ | ○ |
| 27 | $A_2$ (70), $A_1$ (30) | — | — | ◉* | ◉ | ○ | ○ |
| 28 | $A_5$ (100) | — | — | ◉*1 | ◉*2 | ◉ | ◉ |

Note
$A_1$: Ethylene-α-olefin copolymer resin (density, 0.920; crystalline melting point, 120° C.), trade name ULTZEX manufactured by MITSUI PETROCHEMICAL INDUSTRIES, LTD.
$A_2$: Ethylene-α-olefin copolymer resin (density, 0.920; crystalline melting point, 120° C.), trade name ULTZEX manufactured by MITSUI PETROCHEMICAL INDUSTRIES, LTD.
$A_3$: Ethylene-α-olefin copolymer resin (density, 0.930; crystalline melting point, 122° C.), trade name DOWLEX manufactured by DOW CHEMICAL CO.
$A_4$: Ethylene-α-olefin copolymer resin (density, 0.906; crystalline melting point, 118° C.), trade name NUCFLX manufactured by NIPPON UNICAR CO.
$A_5$: Ethylene-α-olefin copolymer resin (density, 0.900; crystalline melting point, 115° C.), trade name EXCELLENT VL manufactured by SUMITOMO CHEMICAL CO., LTD.
$A_6$: Ethylene-α-olefin copolymer resin (density, 0.894; crystalline melting point, 113° C.), trade name NIPOLON L manufactured by TOYO SODA CO., LTD.
$B_1$: Ethylene-α-olefin copolymer elastomer (density, 0.88; VSP, 40° C. or less;
$C_2$: EVA having a vinyl acetate content of 15% by weight.
*1Reject rate was zero.
*2Reject rate was zero even if cooling time was reduced to zero second.

TABLE 7-B

| Sample No. | Resin composition of sealing resin layer Resin used (Blending ratio, %) | | | Reject rate of sealing | Reduction required for sealing | Transparency after shrinking | Synthetic evaluation |
|---|---|---|---|---|---|---|---|
| 29 | $A_1$ (100) | — | — | ◉ | ○ | ○ | ○ |
| 30 | $A_2$ (100) | — | — | ◉ | ◉ | ◉ | ◉ |
| 31 | $A_4$ (100) | — | — | ◉ | ◉ | ◉ | ◉ |
| 32 | $A_1$ (95) | $B_1$ (5) | — | ◉ | ○ | ◉ | ○ |
| 33 | $A_2$ (80) | $B_1$ (20) | — | ◉ | ◉ | ◉ | ◉ |
| 34 | $A_1$ (80) | $B_1$ (10) | $C_1$ (10) | ◉ | ◉ | ◉ | ◉ |
| 35 | $A_2$ (80) | $B_1$ (10) | $C_1$ (10) | ◉ | ◉ | ◉ | ◉ |
| 36 | $A_1$ (70) | $B_1$ (5) | $C_2$ (25) | ◉ | ○ | ○ | ○ |
| 37 | $A_1$ (60) | $B_1$ (40) | — | ◉ | ◉ | ◉ | ○ |
| 38 | $A_3$ (60) | $B_1$ (30) | $C_2$ (10) | ◉ | ◉ | ◉ | ◉ |
| 39 | $A_1$ (60) | $B_1$ (20) | $C_2$ (20) | ◉ | ◉ | ◉ | ◉ |
| 40 | $A_1$ (50) | $B_1$ (30) | $C_2$ (20) | ◉ | ◉ | ◉ | ◉ |
| 41 | $A_3$ (50) | $B_1$ (10) | $C_1$ (40) | ◉ | ◉ | ◉ | ◉ |
| 42 | $A_1$ (40) | $B_1$ (40) | $C_2$ (20) | ○ | ◉ | ◉ | ○ |
| 43 | $A_1$ (40) | $B_1$ (5) | $C_2$ (55) | ○ | ◉ | ○ | ○ |
| 44 | $A_1$ (85) | — | $C_2$ (15) | ◉ | ○ | x | x |
| 45 | $A_1$ (60) | — | $C_2$ (40) | ○ | ○ | x | x |
| 46 | $A_1$ (50) | $B_1$ (50) | — | x | ○ | ○ | x |
| 47 | $A_1$ (40) | — | $C_1$ (60) | △ | ○ | x | x |
| 48 | $A_1$ (30) | $B_1$ (50) | $C_2$ (20) | x | ○ | ○ | x |
| 49 | $A_1$ (30) | $B_1$ (20) | $C_2$ (50) | x | ◉ | ○ | x |
| 50 | $D_1$ (100) | — | — | x | x | x | x |

TABLE 7-B-continued

| Sample No. | Resin composition of sealing resin layer Resin used (Blending ratio, %) | Evaluation result | | | |
|---|---|---|---|---|---|
| | | Reject rate of sealing | Reduction required for sealing | Transparency after shrinking | Synthetic evaluation |
| 51 | $E_1$ (100) — — | x | x | x | x |

Note:
$A_1$: Ethylene-α-olefin copolymer resin (density, 0.920; crystalline melting point, 120° C.), trade name ULTZEX manufactured by MITSUI PETROCHEMICAL INDUSTRIES, LTD.
$A_2$: Ethylene-α-olefin copolymer resin (density, 0.906; crystalline melting point, 118° C.), trade name NUCFLX manufactured by NIPPON UNICAR CO.
$A_3$: Ethylene-α-olefin copolymer resin (density, 0.923; crystalline melting point, 122° C.), trade name DOWLEX manufactured by DOW CHEMICAL CO.
$A_4$: Ethylene-α-olefin copolymer resin (density, 0.89; crystalline melting point, 116° C.), trade name NUCFLX manufactured by NIPPON UNICAR CO.
$B_1$: Ethylene-α-olefin copolymer elastomer (density, 0.88; VSP, 40° C. or less;
$C_1$: EVA having a vinyl acetate content of 10% by weight.
$C_2$: EVA having a vinyl acetate content of 15% by weight.
$D_1$: Ethylene-propylene copolymer resin having an ethylene content of 3.5 molar % (density, 0.90; crystalline melting point, 134° C.).
$E_1$: High density polyethylene (density, 0.953; crystalline melting point, 127° C.).

Example, Comparative Example 3

As for 6 kinds of laminated films of the sample Nos. 17, 28, 29, 32, 33 and 34, evaluation was carried out referring to oil resistance of interior surface at high temperature. The results are listed in Table 8.

According to the results listed in Table 8, it is understood that the film sample Nos. 17, 28, 29, and 32 to 34 are films of which interior surface is excellent in oil resistance at high temperature.

Therefore, this kind of the films is useful for packaging the processed meat such as receiving a fatty content in a cylindrical film and subjecting to sterilizing treatment at high temperature.

TABLE 8

| Sample No. | Oil resistance of interior surface | (referential) Transparency after shrinking |
|---|---|---|
| 17 | ⊚ | ⊚ |
| 28 | ⊚ | ⊚ |
| 29 | ⊚ | ○ |
| 32 | ⊚ | ⊚ |
| 33 | ⊚ | ⊚ |
| 34 | ⊚ | ⊚ |

Example, Comparative Example 4

As for the sample Nos. 17, 28, 36 to 43 and 45 to 49, evaluation as carried out referring to shrinkability at low temperature, oil resistance on interior surface II and transparency of film according to the methods described herein. The results are listed in Table 9.

According to the results shown in Table 9, it is understood that films in the groups of the sample Nos. 17, 28 and 36 to 42, particularly the sample Nos. 17, 28, 36, 38 to 42 are films excellent in shrinkability at low temperature as well as other properties.

Accordingly, these films are those which are useful for receiving a fatty content in a cylindrical film, heat shrinking extensively the film at a low temperature where the content will not be denaturated and forming an attractive tight package of raw meat.

TABLE 9

| Sample No. | Shrinkability at low temperature | Oil resistance on interior surface II | Transparency of film | (Referential) Transparency after shrinking |
|---|---|---|---|---|
| 17 | ⊚ | ⊚ | ⊚ | ⊚ |
| 28 | ⊚ | ⊚ | ⊚ | ⊚ |
| 36 | ⊚ | ○ | ○ | ○ |
| 37 | ○ | ⊚ | △ | ⊚ |
| 38 | ⊚ | ⊚ | ⊚ | ⊚ |
| 39 | ⊚ | ⊚ | ⊚ | ⊚ |
| 40 | ⊚ | ⊚ | ⊚ | ⊚ |
| 41 | ⊚ | ○ | ⊚ | ⊚ |
| 42 | ⊚ | ○ | ⊚ | ⊚ |
| 43 | ⊚ | △ | △ | ○ |
| 45 | ⊚ | ○ | x | x |
| 46 | ⊚ | ○ | x | ○ |
| 47 | ⊚ | x | x | x |
| 48 | ⊚ | x | △ | ○ |
| 49 | ⊚ | x | △ | ○ |

Example, Comparative Example 5

In the apparatus (method) illustrated in FIG. 5, three extruders were respectively arranged for the following resins:

for core layer (one extruder); PVDC (vinylidene chloride-vinyl chloride copolymer comprising a comonomer component derived from the vinyl chloride monomer in the resin in an amount of 7% by weight), for intermediate surface layer of the crosslinked polyolefin type resin layer and adhesive shrinkable resin layer (one extruder); an ethylene-vinyl acetate copolymer resin having a vinyl acetate content of 15% by weight, the sealing resin and the outermost layer crosslinking resin layer (one extruder); [a mixed resin comprising an ethylene-α-olefin copolymer resin having a density of 0.923 and a crystalline melting point of 122° C., (trade name, DOWLEX, manufactured by Dow Chemical Co.) in an amount of 80% by weight, an ethylene-α-olefin copolymer elastomer (trade name, TAFMER, manufactured by MITSUI POLYCHEMICAL CO.) in an amount of 10% by weight and an ethylene-vinyl acetate copolymer resin having a vinyl acetate content of 15% by weight in an amount of 10% by weight. A cylindrical laminated film having a layer construction illustrated in the sample No. 52 in Table 10 and a gel fraction of 36% by weight was accomplished.

In the same time, commercially available films G (manufactured by G Co.) and K (manufactured by K Co.) were obtained, of which layer construction is listed in Table 10. These samples were evaluated together with the representative film sample Nos. 17, 28, 34 and 39 of this invention prepared in Example, Comparative Examples 1 and 2 with reference to substantially all of the evaluation methods described herein to examine synthetically the film properties of this invention in the field of application. The results are listed in Table 11.

According to the result listed in Table 11, it can be appreciated that the films of this invention are superior to commercially available films in all evaluation items and particularly excellent in heat sealability which is useful for improving the packaging efficiency.

For the application which requires high temperature oil resistance there can be used the films of the sample Nos. 34 and 52, and for the application which requires heat shrinkability at lower temperature at high level, there can be selected the film of the sample No. 39. Further, the films of the sample Nos. 17 and 28 have both said heat shrinkability and high temperature oil resistance, so that they are convenient films which can be used for packaging either raw meat or processed meat. Thus, the film performance of this invention can be appreciated more prominent.

Moreover, according to this invention, a film having a five-layer structure and excellent properties can be advantageously prepared by using three extruders with an appropriate selection of layer construction.

TABLE 10

| Sample No. | Layer construction of cylindrical film Exterior layer ⇐⇒ Interior layer | Gel fraction of crosslinkg polyolefin resin layer (% by weight) | | | |
|---|---|---|---|---|---|
| | | Whole layer | Outermost layer [x] | Surface layer in layer (I) side [y] | Gradient of gel fraction [y/x] |
| 17 | Crosslinking*1<br>A$_4$/EVA(Vac. 15%)/PVDC$_1$/EVA(Vac. 15%)/A$_4$<br>10μ/ 15μ/ 8μ/ 21μ/6μ | 38 (part of *1) | 47 | 12 | 0.25 |
| 28 | Crosslinking*2<br>A$_3$/EVA(Vac. 15%)/PVDC$_1$/EVA(Vac. 15%)/A$_5$<br>10μ/ 15μ/ 8μ/ 21μ/6μ | 39 (part of *2) | 46 | 13 | 0.28 |
| 39 | Crosslinking*3<br>EVA(Vac. 10%)/EVA(Vac. 15%)/PVDC$_1$/EVA(Vac. 15%)/Blend composition 2<br>15μ/ 10μ/ 6μ/ 23μ/6μ | 37 (part of *3) | — | — | — |
| 34 | Crosslinking*4<br>EVA(Vac. 10%)/EVA(Vac. 15%)/PVDC$_1$/EVA(Vac. 15%)/Blend composition 3<br>15μ/ 10μ/ 6μ/ 23μ/6μ | 39 (part of *4) | — | — | — |
| 52 | Crosslinking*5<br>Blend compo-/EVA(Vac. 15%)/PVDC$_1$/EVA(Vac. 15%)/Blend composition 4 sition 4 | 36 (part of *5) | — | — | — |
| Commercially available film G | Crosslinking*6<br>EVA(Vac. 10%)/PVDC/EVA(Vac. 10%)<br>15μ/ 10μ/35μ | 41 (part of *6) | — | — | — |
| Commercially available film K | EVA(Vac. 10%)/EVA(Vac. 15%)/PVDC/EVA(Vac. 15%)/IONOMER<br>15μ/ 2μ/ 8μ/ 2μ/34μ | — | — | — | — |

TABLE 11

| Sample No. | Heat shrinkability at low temperature | Shrinkability | Barrier properties | | Falling bag resistance at low temperature | Heat resistance of films | Reject rate of sealing | Reduction of time required for sealing |
|---|---|---|---|---|---|---|---|---|
| | | | After rough treatment under severe condition | After flexing with twisting | | | | |
| 17 | ⊚ | ⊚ | ⊚ | ⊚ | ⊚ | ⊚ | ⊚ | ⊚ |
| 28 | ⊚ | ⊚ | ⊚ | ⊚ | ⊚ | ⊚ | ⊚ | ⊚ |
| 39 | ⊚ | ⊚ | ⊚ | ⊚ | ⊚ | ⊚ | ⊚ | ⊚ |
| 34 | ○ | ⊚ | ⊚ | ⊚ | ⊚ | ⊚ | ⊚ | ⊚ |
| 52 | Δ | ⊚ | ⊚ | ⊚ | ⊚ | ⊚ | ⊚ | ⊚ |
| Com. avail. pro. G | x | ⊚ | x | ⊚ | ○ | ⊚ | Δ | Δ |
| Com. avail. pro. K | x | ⊚ | Δ | x | x | x | x | x |

TABLE 11-continued

| Sample No. | Oil-resistance on exterior surface | Oil resistance on dint | Oil resistance on interior surface | Oil resistance on interior surface II | Transparency of film | Transparency- after shrinking | Transmission of oxygen gas[*1] |
|---|---|---|---|---|---|---|---|
| 17 | ◎ | ◎ | ◎ | ◎ | ◎ | ◎ | 21 |
| 28 | ◎ | ◎ | ◎ | ◎ | ◎ | ◎ | 20 |
| 39 | ◎ | ◎ | △ | ◎ | ◎ | ◎ | 27 |
| 34 | ◎ | ◎ | ◎ | ◎ | ◎ | ◎ | 26 |
| 52 | ◎ | ◎ | ◎ | ◎ | ◎ | ◎ | 27 |
| Com. avail. pro. G | x | ◎ | △ | ◎ | ◎ | ◎ | 35 |
| Com. avail. pro K | x | x | △ | ○ | ◎ | △ | 17 |

[*1]Measured in accordance with ASTMD 3985; unit; cc/m$^2$.24 hrs. atm. (at 23° C.).

INDUSTRIAL APPLICABILITY

As explained above, this invention accomplished for the first time a co-extruded cylindrical laminated film having a surface crosslinking resin layer which was irradiated with electron rays. This crosslinking resin layer improves film forming ability by drawing during the production process and also improves as a resin layer the heat resistance, oil resistance, rub resistance, toughness and the like, to improve the whole properties of the film. In addition, the crosslinking resin layer leads to the firm bonding with the core layer. Particularly, in the film of this invention there are arranged a heat resistant crosslining resin and a sealing resin layer of a selected resin at the surface layer and the innermost layer, respectively, so that as a combination effect thereof great effect is exhibited for the reduction of the sealing time which serves for improving the packaging ability and the elimination of defective rate at sealing part. This effect leads to settlement of the most serious problem in the art of packaging, and thus this invention is very useful to industry.

We claim:

1. A process for producing a cross-linked laminated film which comprises:
   (a) forming a laminate by disposing at least one polyolefin resin layer (II) on one side of an oxygen barrier core layer (I); and the disposing an adhesive shrinkable resin layer (III) and sealing resin layer (IV) in this order on the other side od said core layer (I),
   (b) irradiating an electron beam to said laminate from the surface side of the layer (II) so as to cause the layer (II) to have a gel fraction x at the outside portion of 25-70% by weight, a gel fraction y at the inner portion contacting the side of the layer (I) of 40% by weight or less, and a gradient of gel fraction represented by y/x of 0.6 or less, without cross-linking the layer (IV), an
   (c) stretching the thus cross-linked laminate.

2. A process according to claim 1, wherein said electron beam is irradiated so that the average gel fraction of said denatured and cross-linked resin layer (II) is in the range of 20-60% by weight, and the thickness of said denatured and cross-linked polyolefin resin layer is in a proportion of 25-65% based on the total thickness of the film.

3. A process according got claim 1, wherein said denatured and cross-linked polyolefin layer (II) comprises two resin layers, the cross-linking efficiencies of which are different from each other, said two resin layers being arranged in a two layer structure wherein the resin layer having a lower cross-linking efficiency is arranged as an outermost layer.

4. A process according to claim 1, wherein said adhesive shrinkable resin layer (III) is an ethylene-vinyl acetate copolymer resin having a vinyl acetate content in the range of 13-20% by weight.

5. A process according to claim 1, wherein said sealing resin layer (IV) comprises a resin selected from the group consisting of an ethylene-α-olefin copolymer resin A having a density of 0.88-0.93 and a crystalline melting point of 110°-130° C., a mixed resin comprising 60% by weight or more of said resin A and 40% by weight or less of an theylene-α-olefin copolymer elastomer resin B and a mixed resin comprising 40% by weight or more of said resin A, 5-40% by weight of said resin B and 55% by weight or less of an ethylene-vinyl acetate copolymer resin C, wherein the percentages of the components in said mixed resins amount to 100% in total.

6. A process according to claim 1, wherein said cross-linked polyolefin resin layer (II) comprises a resin selected from the group consisting of an ethylene-α-olefin copolymer resin A having a density of 0.88-0.93 and a crystalline melting point of 110°-130° C. and an ethylene-vinyl acetate copolymer resin D, and the construction thereof is a single layer of the resin A or the resin D, a combination of two layers of the resin D wherein the outermost surface layer has a different cross-linking efficiency from the cross-linking efficiency of the inner layer adjacent thereto, or a combination of two layers in which the outermost surface layer consists of the resin A and the inner surface layer consists of the resin D.

7. A process according to claim 1, wherein said oxygen barrier core layer (I) is a vinylidene chloride-vinyl chloride copolymer resin having a content of the vinyl chloride component as a comonomer of 10-25% by weight.

8. A process according to claim 1, wherein said oxygen barrier core layer (I) is a vinylidene chloride-methyl acrylate copolymer resin having a content of the methyl acrylate component as a comonomer of 3-15% by weight.

9. A process according to claim 6, wherein in both said cross-linked polyolefin resin layer (II) and said sealing resin layer (IV), the same resin selected from the resins of the sealing resin layer is used.

10. A process according to claim 1, wherein both the inner surface layer portion of the cross-linked polyolefin resin layer (II) and the adhesive shrinkable resin layer (III), an ethylene-vinyl acetate copolymer resin is used.

11. A process according to claim 1, wherein the laminated film has a thickness of 40-80μ in total, said core layer (I) having a thickness of 4-15μ, said sealing resin layer (IV) having a thickness of 4μ or more and 40% or less in proportion to the total thickness, said cross-linked polyolefin resin layer (II) having a thickness of 25-65% in proportion to the total thickness and said adhesive shrinkable resin layer (III) having a thickness of the balance of the total thickness.

12. A process according to claim 1, wherein said oxygen barrier core layer (I) is an ethylene-vinyl alcohol copolymer.

* * * * *